United States Patent [19]

Yamakawa et al.

[11] Patent Number: 5,607,772
[45] Date of Patent: Mar. 4, 1997

[54] MAGNETIC RECORDING MEDIUM HAVING A SPECIFIED BINDER SYSTEM

[75] Inventors: Masahiro Yamakawa; Kenji Akimoto, both of Kawasaki; Katsuya Nakamura, Tokyo; Fumio Takano, Kawasaki; Takahiro Takasaki, Yokohama, all of Japan

[73] Assignee: Nippon Zeon Co., Ltd., Tokyo, Japan

[21] Appl. No.: 401,705

[22] Filed: Mar. 10, 1995

[30] Foreign Application Priority Data

| Mar. 11, 1994 | [JP] | Japan | 6-067923 |
| Mar. 17, 1994 | [JP] | Japan | 6-072468 |
| Sep. 29, 1994 | [JP] | Japan | 6-259265 |
| Sep. 30, 1994 | [JP] | Japan | 6-262047 |

[51] Int. Cl.$^6$ ............................................. G11B 5/702
[52] U.S. Cl. .................. 428/425.9; 428/522; 428/523; 428/694 B; 428/694 BU; 428/694 BG; 428/900; 252/62.54
[58] Field of Search .................. 428/425.9, 694 B, 428/694 BU, 694 BG, 323, 900, 522, 523; 252/62.54

[56] References Cited

U.S. PATENT DOCUMENTS

| 2,830,038 | 4/1958 | Pattison | 528/49 |
| 3,445,436 | 5/1969 | Lake et al. | 528/49 |
| 4,069,208 | 1/1978 | Hoeschelle | 525/415 |
| 4,748,084 | 5/1988 | Hata et al. | 428/425.9 |
| 4,784,914 | 11/1988 | Matsufuji et al. | 428/418 |

FOREIGN PATENT DOCUMENTS

| A-61095082 | 11/1988 | Japan. | |
| A-1161178 | 6/1967 | United Kingdom | C08G 30/00 |

OTHER PUBLICATIONS

Abstract of JP 58–41565.
Abstract of JP 63–55549.
Abstract of JP 55–40927.
Abstract of JP 1–109523.
Abstract of JP 3–141020.
Abstract of JP 3,79764.

*Primary Examiner*—Stevan A. Resan
*Attorney, Agent, or Firm*—Millen, White, Zelano & Branigan, P.C.

[57] ABSTRACT

A binder for coating materials containing dispersed inorganic powder comprises a polyurethane resin containing (a) 2.2 to 7.0 terminal epoxy groups in one molecule in average and (b) 0.1 to 5.0% by weight as $SO_3-$ of a sulfonic acid salt group, 0.05 to 3.0% by weight as $COO-$ of a carboxylic acid salt group, or 0.02 to 1.0% by weight as $N^+$ of a quaternary ammonium salt group in the molecule, and having a number-average molecular weight of 2,000 to 10,000. A coating material containing dispersed inorganic powder and a magnetic recording medium both use this binder. In a recording medium comprising a magnetic layer placed on a non-magnetic substrate, the magnetic layer comprises polyurethane resin (A) as a binder, vinyl chloride polymer (B) containing 0.1 to 20% by weight of epoxy group and having an average degree of polymerization of 100 to 500, as another binder, (C) an alicylic acid anhydride as a crosslinking agent, and (E) a tertiary amine as a catalyst, and at least one of the binders is crosslinked between the epoxy groups therein by the reaction in which components (C) and (E) take part. The coating material containing fine inorganic powder dispersed with stability and having a low viscosity can be obtained by using, as the binder, the polyurethane resin having terminal epoxy groups and one of a sulfonic acid salt group, a carboxylic acid salt group, and a quaternary ammonium salt group. The magnetic recording material prepared by using magnetic powder as the inorganic powder and crosslinking the binder is excellent in dispersion of the magnetic powder and smoothness of the surface. Therefore, the magnetic recording medium is excellent in magnetic properties, durability, and running properties.

12 Claims, No Drawings

MAGNETIC RECORDING MEDIUM HAVING A SPECIFIED BINDER SYSTEM

BACKGROUND OF THE INVENTION

1. Field of the Invention

The present invention relates to a binder for coating materials containing dispersed inorganic powder, a coating material containing dispersed inorganic powder, and a magnetic recording medium. More particularly, the present invention relates to a binder for coating materials containing dispersed inorganic powder and a coating material containing dispersed inorganic powder which are excellent in dispersion of inorganic powder and stability of the dispersion and provide a coating layer having advantageous properties, and a magnetic recording medium which uses the coating material as the magnetic coating material, and provides a magnetic tape and the like having excellent magnetic properties, durability, and running property.

2. Description of the Related Art

A coating material generally contains three main components which are a binder for forming a coating layer, a solvent, and a pigment or a magnetic powder. Auxiliary materials are added, if necessary. The binder for forming a coating layer is the component which is converted into a solid film after the coating material is dried. The binder is the most important component of a coating material. The solvent has an important role of adjusting viscosity of a coating material, helping dispersion of pigment in the coating material, and enabling smooth coating of a surface and formation of a film. The pigment includes coloring pigments which are used for the purpose of coloring a coating layer, fillers which are used for the purposes of improving workability in the coating operation and enhancing mechanical properties of the coating layer, and special functional pigments which provide the coating layer with special functions, such as prevention of corrosion and the like. A magnetic coating material contains magnetic powder dispersed in a mixture of a binder for forming a coating layer and a solvent in place of the pigment dispersed similarly. By applying a magnetic coating material to a non-magnetic substrate to form a magnetic layer, a magnetic recording medium such as a magnetic tape, a magnetic disk, and a magnetic card, can be prepared.

Recently, a higher recording density is required for magnetic recording media. For example, it is required that magnetic tapes have a higher saturated density of magnetic flux Bm, a higher rectangular ratio Rs (residual density of magnetic flux Br/saturated density of magnetic flux Bm), lower roughness of the surface, and, furthermore, better flexibility and abrasion resistance. As a higher S/N ratio is being required, it is required that fine magnetic powder having a higher specific surface area such as 30 $m^2/g$ to 70 $m^2/g$ be used, and a binder should have a combination of more excellent dispersing property and ability to form tougher binding so that the fine magnetic powder is homogeneously dispersed and firmly bound.

However, satisfactory results with respect to any of the dispersion property of the magnetic powder and the abrasion resistance of the magnetic layer cannot be obtained by using binders which have heretofore been used, such as polyester resins, cellulosic resins, polyurethane resins, phenol resins, epoxy resins, polyamide resins, and homopolymers and copolymers using vinyl chloride, vinylidene chloride, vinyl acetate, (meth)acrylic acid esters, (meth)acrylamide, (meth)acrylonitrile, butadiene, styrene, vinyl esters, and the like.

Among these binders, polyurethane resins have been widely used because of good abrasion resistance. However, polyurethane resins have a drawback in that it has poor ability to adsorb magnetic powder, and therefore, particularly poor ability to disperse fine magnetic powder having a large specific surface area described above.

For overcoming the above drawback in conventional polyurethane resins, incorporation of a residue group of a sulfonic acid salt or the like into the molecular chain has been proposed [Japanese Patent Publication Nos. Showa 58(1983)-41565 and Showa 63(1988)-55549]. However, when a polyurethane resin has a low molecular weight, the coating layer formed has low abrasion resistance and strength even though the dispersion property is improved. When the molecular weight is increased for improving abrasion resistance and strength which are the characteristics of the polyurethane resin, the effect of improving dispersion of magnetic powder cannot be obtained. Furthermore, when the molecular weight is increased, viscosity of the magnetic coating material containing dispersed magnetic powder is increased and dispersion of the magnetic powder deteriorates.

Because viscosity of a magnetic coating material tends to be increased when a finer magnetic powder is used, improvement of strength by methods other than the increase in the molecular weight is necessary. Crosslinking of a binder with a polyisocyanate compound is widely utilized as one of such methods. For enabling the crosslinking by a polyisocyanate compound, incorporation of a functional group having an active hydrogen which can react with the isocyanate group, such as hydroxyl group as a representative example, into the binder has been adopted.

However, for exhibiting sufficient strength with a polyurethane resin which has a decreased molecular weight for improving the dispersion property, a large amount of hydroxyl group must be incorporated into the molecule as the crosslinking points. When a large amount of hydroxyl group is incorporated, a magnetic coating material containing fatty acids or fatty acid esters which are generally used as lubricants shows decrease in the stability of dispersion, and a magnetic recording medium having good properties cannot be produced.

It is also proposed that epoxy group is incorporated into a polyurethane resin and used for crosslinking [Japanese Patent Publication No. Showa 55(1980)-40927, Japanese Patent Application Laid-Open No. Heisei 1(1989)-109523]. However, it has been found that the binder thus produced has too poor ability for dispersion and cannot be applied to fine magnetic powder.

For solving these problems, the present inventors have proposed that a magnetic recording medium having excellent durability can be obtained by combining a polyurethane resin having a polyfunctional isocyanate group with a vinyl chloride polymer in particular and using the combination as a binder [Japanese Patent Application Laid-Open No. Heisei 3(1991)-141020]. However, it is frequently practiced in recent years that metal magnetic powder having a strong adhesive force is dispersed by using an apparatus having a high shear force, such as a pressurized kneader. In such cases as the kneading under a condition of an extreme high viscosity, heat generation tends to take place. This situation occasionally causes another problem that dispersion deteriorates against the intention because reaction of the reactive binder further proceeds during the kneading process.

SUMMARY OF THE INVENTION

Extensive investigations were undertaken by the present inventors to develop a binder containing dispersed inorganic powder which provides a stable coating material containing dispersed inorganic powder, showing good dispersion of the inorganic powder in the coating material, and providing a tough coating layer having durability, and it has been discovered that a coating material containing dispersed inorganic powder which has a low viscosity and contains fine inorganic powder dispersed with stability, can be obtained by using a specific polyurethane resin having terminal epoxy groups as the binder for the inorganic powder, that this binder is particularly suitable as a binder for magnetic coating materials, and that the magnetic recording medium obtained by applying the magnetic coating material prepared by using this binder to a non-magnetic substrate and crosslinking the magnetic coating material, has an excellent magnetic property, durability, and running property, and can satisfy the requirements for higher recording density and higher durability of a magnetic recording medium. The present invention has been completed on the basis of the discovery.

Accordingly, the present invention provides:

(1) a binder for coating materials containing dispersed inorganic powder which comprises a polyurethane resin containing (a) 2.2 to 7.0 terminal epoxy groups in one molecule in average and (b) a sulfonic acid salt group, a carboxylic acid salt group, or a quaternary ammonium salt group in the molecule, and having a number-average molecular weight of 2,000 to 10,000;

(2) a binder for coating materials containing dispersed inorganic powder according to (1), wherein the amount of the sulfonic acid salt group is from 0.1 to 5.0% by weight as $SO_3$—, and the amount of the carboxylic acid salt group is from 0.05 to 3.0% by weight as COO—, and the amount of the quaternary ammonium salt group is from 0.02 to 1.0% by weight as $N^+$;

(3) a binder for coating materials containing dispersed inorganic powder according to any of (1) and (2), wherein the polyurethane resin contains 2.3 to 5.0 terminal epoxy groups in one molecule in average;

(4) a binder for coating materials containing dispersed inorganic powder according to any of (1) and (2), wherein the polyurethane resin has a number-average molecular weight of 2,500 to 8,000;

(5) a binder for coating materials containing dispersed inorganic powder which comprises (A) a polyurethane resin containing (a) 2.2 to 7.0 terminal epoxy groups in one molecule in average and (b) a sulfonic acid salt group, a carboxylic acid salt group, or a quaternary ammonium salt group in the molecule, and having a number-average molecular weight of 2,000 to 10,000, and (B) a vinyl chloride polymer having an average degree of polymerization of 100 to 500 and containing 0.1 to 20% by weight of epoxy group, a styrene polymer having a number-average molecular weight of 5,000 to 50,000 and containing 0.1 to 20% by weight of epoxy group, or a (meth)acrylate polymer having a number-average molecular weight of 5,000 to 50,000 and containing 0.1 to 20% by weight of epoxy group, the ratio by weight of component (A) to component (B) being from 8:2 to 2:8;

(6) a coating material containing dispersed inorganic powder which comprises (A) a polyurethane resin containing (a) 2.2 to 7.0 terminal epoxy groups in one molecule in average and (b) 0.1 to 5.0% by weight as $SO_3$— of a sulfonic acid salt group, 0.05 to 3.0% by weight as COO— of a carboxylic acid salt group, or 0.02 to 1.0% by weight as $N^+$ of a quaternary ammonium salt group in the molecule, and having a number-average molecular weight of 2,000 to 10,000, (C) a crosslinking agent for epoxy group, and (D) an inorganic powder;

(7) a coating material containing dispersed inorganic powder which comprises (A) a polyurethane resin containing (a) 2.2 to 7.0 terminal epoxy groups in one molecule in average and (b) a sulfonic acid salt group, a carboxylic acid salt group, or a quaternary ammonium salt group in the molecule, and having a number-average molecular weight of 2,000 to 10,000, (B) a vinyl chloride polymer having an average degree of polymerization of 100 to 500 and containing 0.1 to 20% by weight of epoxy group, a styrene polymer having a number-average molecular weight of 5,000 to 50,000 and containing 0.1 to 20% by weight of epoxy group, or a (meth)acrylate polymer having a number-average molecular weight of 5,000 to 50,000 and containing 0.1 to 20% by weight of epoxy group, (C) a crosslinking agent for epoxy group, and (D) an inorganic powder, the ratio by weight of component (A) to component (B) being from 8:2 to 2:8;

(8) a coating material containing dispersed inorganic powder according to any of (6) and (7), wherein the polyurethane resin contains 0.3 to 3.0% by weight as $SO_3$— of the sulfonic acid salt group, 0.2 to 2.0% by weight as COO— of the carboxylic acid salt group, or 0.05 to 0.5% by weight as $N^+$ of the quaternary ammonium salt group;

(9) a coating material containing dispersed inorganic powder according to any of (6), (7) and (8), wherein the inorganic powder is a magnetic powder;

(10) a recording medium comprising a non-magnetic substrate and a magnetic layer placed on the non-magnetic substrate, wherein the magnetic layer comprises magnetic powder dispersed therein and a polyurethane resin containing (a) 2.2 to 7.0 terminal epoxy groups in one molecule in average and (b) 0.1 to 5.0% by weight as $SO_3$— of a sulfonic acid salt group, 0.05 to 3.0% by weight as COO— of a carboxylic acid salt group, or 0.02 to 1.0% by weight as $N^+$ of a quaternary ammonium salt group in the molecule, and having a number-average molecular weight of 2,000 to 10,000, as a binder; and the binder is crosslinked;

(11) a recording medium comprising a non-magnetic substrate and a magnetic layer placed on the non-magnetic substrate, wherein the magnetic layer comprises a magnetic powder dispersed therein, (A) a polyurethane resin containing (a) 2.2 to 7.0 terminal epoxy groups in one molecule in average and (b) 0.1 to 5.0% by weight as $SO_3$— of a sulfonic acid salt group, 0.05 to 3.0% by weight as COO— of a carboxylic acid salt group, or 0.02 to 1.0% by weight as $N^+$ of a quaternary ammonium salt group in the molecule, and having a number-average molecular weight of 2,000 to 10,000, as a binder, and (B) a vinyl chloride polymer having an average degree of polymerization of 100 to 500 and containing 0.1 to 20% by weight of epoxy group, a styrene polymer having a number-average molecular weight of 5,000 to 50,000 and containing 0.1 to 20% by weight of epoxy group, or a (meth)acrylate polymer having a number-average molecular weight of 5,000 to 50,000 and containing 0.1 to 20% by weight of epoxy group, as another binder, the ratio by weight of component (A) to component (B) being from 8:2 to 2:8; and the binders are crosslinked;

(12) a recording medium according to (11), wherein the vinyl chloride polymer, the styrene polymer, or the (meth)acrylate polymer additionally contains at least one of anionic hydrophilic groups which are selected from the group consisting of carboxyl group, acids containing sulfur or phosphorus, and salts of acids containing sulfur or phosphorus, and cationic hydrophilic groups which are selected from the group consisting of —$N^+R^1R^2R^3X^-$ and —$N^+R^1R^2 \cdot HX^1$ ($R^1$, $R^2$, and $R^3$ each represent an alkyl group, an alkenyl group, or an alkoxy group, X and $X^1$ each represent a halogen, a residue group of an inorganic acid selected from sulfuric acid, phosphoric acid, and nitric acid, a residue group of an organic acid selected from carboxylic acids, hydrogensulfuric acid esters, and hydrogenphosphoric acid esters);

(13) a recording medium according to any of (10), (11) and (12), wherein the polyurethane resin contains 2.3 to 5.0 terminal epoxy groups in one molecule in average;

(14) a recording medium according to any of (10), (11) and (12), wherein the polyurethane resin has a number-average molecular weight of 2,500 to 8,000;

(15) a recording medium according to any of (10), (11) and (12), wherein the polyurethane resin contains 0.3 to 3.0% by weight as $SO_3$— of the sulfonic acid salt group, 0.2 to 2.0% by weight as COO— of the carboxylic acid salt group, 0.05 to 0.5% by weight as $N^+$ of the quaternary ammonium salt group;

(16) a recording medium comprising a non-magnetic substrate and a magnetic layer placed on the non-magnetic substrate, wherein the magnetic layer comprises (A) a polyurethane resin containing 2.2 to 7.0 terminal epoxy group in one molecule in average and having a number-average molecular weight of 2,000 to 10,000, as a binder, (B) a vinyl chloride polymer containing 0.1 to 20% by weight of epoxy group and having an average degree of polymerization of 100 to 500, as another binder, (C) an alicyclic acid anhydride in such an amount that the ratio by mol of the alicyclic anhydride to the total epoxy group is from 0.30 to 1.0, as a crosslinking agent, and (E) a tertiary amine in such an amount that the ratio by mol of the tertiary amine to the alicyclic acid anhydride is from 0.10 to 0.28, as a catalyst; and at least one of the binders is crosslinked between the epoxy groups therein by the reaction in which components (C) and (E) take part;

(17) a recording medium a non-magnetic substrate and a magnetic layer placed on the non-magnetic substrate, wherein the magnetic layer comprises (A) a polyurethane resin containing (a) 2.2 to 7.0 terminal epoxy group in one molecule in average and (b) 0.1 to 5.0% by weight as $SO_3$— of a sulfonic acid salt group, 0.05 to 3.0% by weight as COO— of a carboxylic acid salt group, or 0.02 to 1.0% by weight as $N^+$ of a quaternary ammonium salt group in the molecule, and having a number-average molecular weight of 2,000 to 10,000, as a binder, (B) a vinyl chloride polymer containing 0.1 to 20% by weight of epoxy group and having an average degree of polymerization of 100 to 500, as another binder, (C) an alicyclic acid anhydride in a such an amount that the ratio by mol of the alicyclic anhydride to the total epoxy group is from 0.30 to 1.0, as a crosslinking agent, and (E) a tertiary amine in such an amount that the ratio by mol of the tertiary amine to the alicyclic acid anhydride is from 0.10 to 0.28, as the catalyst; and at least one of the binders is crosslinked between the epoxy groups therein by the reaction in which components (C) and (E) take part;

(18) a recording medium according to (17), wherein the vinyl chloride polymer, the styrene polymer, or the (meth)acrylate polymer additionally contains at least one of anionic hydrophilic groups which are selected from the group consisting of carboxyl group, acids containing sulfur or phosphorus, and salts of acids containing sulfur or phosphorus, and cationic hydrophilic groups which are selected from the group consisting of —$N^+R^1R^2R^3X^-$ and —$N^+R^1R^2 \cdot HX^1$ ($R^1$, $R^2$, and $R^3$ each represent an alkyl group, an alkenyl group, or an alkoxy group, and X and $X^1$ each represent a halogen, a residue group of an inorganic acid selected from sulfuric acid, phosphoric acid, and nitric acid, or a residue group of an organic acid selected from carboxylic acids, hydrogensulfuric acid esters, and hydrogenphosphoric acid esters);

(19) a recording medium according to any of (16), (17) and (18), wherein the polyurethane resin contains 2.3 to 5.0 terminal epoxy groups in one molecule in average;

(20) a recording medium according to any of (16), (17) and (18), wherein the polyurethane resin has a number-average molecular weight of 2,500 to 8,000; and

(21) a recording medium according to any of (16), (17) and (18), wherein the vinyl chloride polymer has an average degree of polymerization of 100 to 200.

Other and further objects, features and advantages of the invention will appear more fully from the following description.

DETAILED DESCRIPTION OF THE INVENTION

The binder of the present invention comprises a polyurethane resin containing (a) 2.2 to 7.0 terminal epoxy groups in one molecule in average and (b) 0.1 to 5.0% by weight as $SO_3$— of a sulfonic acid salt group, 0.05 to 3.0% by weight as COO— of a carboxylic acid salt group, or 0.02 to 1.0% by weight as $N^+$ of a quaternary ammonium salt group in the molecule, and having a number-average molecular weight of 2,000 to 10,000.

The molecular weight of the polyurethane resin used in the present invention is measured by using the gel permeation chromatography and calibrated by using polystyrene having a known molecular weight. The molecular weight of the polyurethane resin used in the present invention is from 2,000 to 10,000, preferably from 2,500 to 8,000, as the number-average molecular weight. When the number-average molecular weight is less than 2,000, strength is low and a good binder cannot be obtained. When the number-average molecular weight is more than 10,000, the coating material containing dispersed inorganic powder therein has an excessively high viscosity, and the dispersion property deteriorates.

The number of the terminal epoxy group in the polyurethane resin used in the present invention is from 2.2 to 7.0, preferably from 2.3 to 5.0, in one molecule in average. When the number of the terminal epoxy group is less than 2.2, a sufficient network structure cannot be formed by crosslinking of the polyurethane resin, and satisfactory mechanical properties and abrasion resistance cannot be obtained. When the number of the terminal epoxy group is more than 7.0, solubility of the polyurethane resin in solvents is decreased.

In the polyurethane resin of the present invention, the amount of the sulfonic acid salt group is from 0.1 to 5.0% by weight, preferably from 0.3 to 3.0% by weight, as $SO_3$—. The amount of the carboxylic acid salt group is 0.05 to 3.0% by weight, preferably 0.2 to 2.0% by weight, as COO—. The amount of the quaternary ammonium salt group is 0.02 to 1.0% by weight, preferably 0.05 to 0.5% by weight, as $N^+$. When the amount of the sulfonic acid salt group, the carboxylic acid salt group, or the quaternary ammonium salt group is less than the respective specified range, sufficient property to disperse an inorganic powder is not exhibited. When the amount of the sulfonic acid salt group, the carboxylic acid salt group, or the quaternary ammonium salt group is more than the respective specified range, solubility to solvents is decreased, and the property to disperse an inorganic powder deteriorates as the result.

In the present invention, the sulfonic acid salt group is a group represented by —$SO_3M$, wherein M represents an alkali metal or ammonium group. The carboxylic acid salt group is a group represented by —COOM, wherein M represents an alkali metal or ammonium group. The quaternary ammonium salt group is a group represented by —$N^+R^1R^2R^3X^-$, wherein $R^1$, $R^2$, and $R^3$ each represent an organic group, such as an alkyl group, an alkenyl group, or an aryl group, which may be the same or different, X represents a halogen, a residue group of an inorganic acid, such as sulfuric acid, phosphoric acid, or nitric acid, or a residue group of an organic acid, such as a carboxylic acid, a hydrogensulfuric acid ester, or a hydrogenphosphoric acid ester.

The polyurethane resin containing a sulfonic acid salt group can be obtained, for example, by a method in which a prepolymer having terminal isocyanate groups is prepared from an organic polyisocyanate, a high molecular weight polyol having two or more hydroxyl groups, and a compound having both hydroxyl group and a sulfonic acid salt group, and then a compound having both hydroxyl group and epoxy group is added to the prepolymer prepared; or a method in which a compound having both hydroxyl group and double bond is added to the prepolymer prepared above, and the product is epoxidized by an epoxidizing agent, such as a percarboxylic acid. The polyurethane resin containing a carboxylic acid salt group can be obtained by similar methods to those described above except that a compound having both hydroxyl group and a carboxyl acid salt group or a compound having both amino group and a carboxyl acid salt group is used in place of the compound having both hydroxyl group and a sulfonic acid salt group. The polyurethane resin containing a quaternary ammonium salt group can preferably be obtained by similar methods to those described above except that the compound having both hydroxyl group and a sulfonic acid salt group, the compound having both hydroxyl group and a carboxylic acid salt group, or the compound having both amino group and a carboxyl acid salt group is not used, but the ends of the molecule are epoxidized and then a quaternary ammonium salt is formed by adding a tertiary amine and an acid component for the counter ion.

In the synthesis of the polyurethane resin described above, it is preferred that a low molecular weight polyol having two or more hydroxyl groups is used as an additional component of the polyol component in the synthesis of the prepolymer. When the low molecular weight polyol is used as the additional component in the polyol component, hard segments are formed by the formation of a low molecular weight prepolymer, and a polyurethane resin having a higher strength as whole can be obtained. The ratio by mol of the high molecular weight polyol to the low molecular weight polyol is preferably from 1/1 to 8/1, more preferably from 2/1 to 6/1. When the ratio by mol of the high molecular weight polyol to the low molecular weight polyol is less than 1/1, heterogeneous structures tend to be formed because of the difference in the reaction rates in the synthesis of the polyurethane, and the polyurethane resin formed occasionally has insufficient flexibility. When the ratio by mol of the high molecular weight polyol to the low molecular weight polyol is more than 8/1, there is the possibility that stiffness of the polyurethane resin is insufficient.

For the preparation of the polyurethane resin used in the present invention, a prepolymer containing 2.2 or more terminal isocyanate groups in one molecule in average is obtained by the reaction of an organic polyisocyanate and a polyol in such amounts that the ratio by mol of NCO/OH is in the range from 1.2/1 to 2/1. It is preferable in this step of the preparation that polyols having lower reaction rates to the isocyanate, such as polyols having higher molecular weights and polyols having lower reactivities, are brought into the reaction before those having higher reaction rates, and the polyols are successively brought into the reaction in the order of the increasing reaction rate in order to achieve the uniform reaction for formation of the polyurethane. Then, epoxy groups are added to the ends of the prepolymer. For adding the epoxy groups to the ends, a compound having one hydroxyl group and one or more epoxy groups is brought into reaction with the terminal isocyanate groups, or a compound having one hydroxyl group and a double bond at the end of the molecule is brought into reaction with the terminal isocyanate group, and then the terminal double bond incorporated are oxidized by an epoxidizing agent to form epoxy groups.

Examples of the organic isocyanate group used in the present invention include 2,4-tolylene diisocyanate (referred to as 2,4-TDI, hereinafter), 2,6-tolylene diisocyanate (referred to as 2,6-TDI, hereinafter), mixtures of these compounds, 4,4'-diphenylmethane diisocyanate (referred to as MDI, hereinafter), p-phenylene diisocyanate, m-phenylene diisocyanate, 1,5-naphthylene diisocyanate, isophorone diisocyanate, hexamethylene diisocyanate, lysin diisocyanate, xylylene diisocyanate, cyclohexane diisocyanate, hydrogenated MDI, benzene triisocyanate, lysin ester triisocyanate, 1,6,11-undecane triisocyanate, 1,3,6-hexamethylene triisocyanate, bicycloheptane triisocyanate, and mixture of these compounds. Among these compounds, MDI, 2,4-TDI, and mixture thereof are preferable.

Examples of the high molecular weight polyol having two or more hydroxyl groups used in the present invention include a polyether polyol, a polyester polyol, or the like, having a molecular weight of 500 to 3,000. Examples of the polyether polyol include compounds having a structure obtained by polycondensation of a glycol, such as ethylene glycol, 1,2-propylene glycol, 2,3-butylene glycol, 1,4-butylene glycol, 2,2-dimethyl-1,3-propanediol (neopentyl glycol), diethylene glycol, 1,5-pentamethylene glycol, 1,6-hexamethylene glycol, 3-methyl-1,5-pentanediol, cyclohexane-1,4-diol, cyclohexane-1,4-dimethanol, or the like, used singly or as a mixture thereof. Other examples of the polyether polyol include polyethylene ether polyol, polypropylene ether polyol, and polybutylene ether polyol which are obtained by addition of ethylene oxide, propylene oxide, and butylene oxide, respectively, to the polyether polyol described above; and polycaprolactone diols obtained by ring-opening addition polymerization of ε-caprolactone in the presence of the glycol described above. Examples of the polyester polyol described above include compounds obtained by polycondensation of a single type or a mixture of two or more types of the glycol described above with a dibasic acid, such as succinic acid, maleic acid, adipic acid, glutaric acid, pimelic acid, suberic acid, azelaic acid, sebacic acid, phthalic acid, isophthalic acid, terephthalic acid, hexahydroterephthalic acid, hexahydroisophthalic acid, or the like, an ester of the dibasic acid, or a halide of the dibasic acid. Other examples of the polyester polyol include polyester polyols obtained by polycondensation of a mixture of the low molecular weight glycol described above and a polyol having three or more hydroxyl groups in the molecule, such as trimethylolethane, trimethylolpropane, glycerol, pentaerythritol, triethanolamine, or the like, with the dibasic acid described above, the ester thereof, or the halide thereof.

As the low molecular weight polyol having two or more hydroxyl groups used in the present invention, a polyol having a molecular weight of 60 to 300 is preferably used. Examples of the low molecular weight polyol include glycols used as the materials of the preparation of the high molecular weight polyether polyols described above. Other examples of the low molecular weight polyol include diols obtained by addition of 2 to 4 mols of ethylene oxide, propylene oxide, butylene oxide, or the like, to hydroquinone, and low molecular weight triols and tetraols, such as trimethylolethane, trimethylolpropane, glycerol, pentaerythritol, triethanolamine, and the like.

Preferable examples of the compound having both hydroxyl group and a sulfonic acid salt group include polyester diols having a molecular weight of 3000 or less which are obtained by polycondensation of 5-sodium sulfoisophthalic acid or a diester thereof, a low molecular weight glycol, and another dibasic acid; and compounds obtained by incorporating the sulfonic acid salt group into double bonds at the inside of an unsaturated polyester which has hydroxyl groups at both ends thereof and has a molecular weight of 3000 or less, by using sodium hydrogensulfite or the like.

As the compound having both hydroxyl group and a carboxyl acid salt group which is used for obtaining the polyurethane resin containing a carboxylic acid salt group in the present invention, a compound having two hydroxyl groups and a carboxylic acid salt group in the molecule, a compound having one hydroxyl group and a carboxylic acid salt group in the molecule, or the like, can be used. Examples of the compound having two hydroxyl groups and a carboxylic acid salt group in the molecule include sodium 2,4-dioxybenzoate, sodium dimethylolpropionate, sodium 4,4-bishydroxyphenylbutyric acid, and the like. Examples of the compound having one hydroxyl group and carboxylic acid salt groups in the molecule include sodium salicylate, sodium glycolate, or the like. As the compound having one amino group and a carboxylic acid salt group in the molecule, sodium p-aminobenzoate, or the like, can be used.

Examples of the tertiary amine used for forming a quaternary ammonium salt group by the addition to the terminal epoxy groups in the prepolymer in the present invention include tertiary amines, such as pyridine, dimethyllaurylamine, dimethylstearylamine, triethylamine, diethylmethoxyethylamine, and the like. In the reaction of addition of the amine, an acid, such as acetic acid, lactic acid, chloroacetic acid, or the like, may be additionally used.

Examples of the compound having one hydroxyl group and one or more epoxy groups used in the present invention include compounds having one hydroxyl group at an end of the molecule and one epoxy group at the other end of the molecule, such as 2,3-epoxy-1-propanol, 3,4-epoxy-1-butanol, 5,6-epoxy-1-hexanol, 7,8-epoxy-1-octanol, and the like; and compounds having one hydroxyl group and two or more epoxy groups, such as diglycidyl ether of glycerol, diglycidyl ether of trimethylolpropane, diglycerol polyglycidyl ether, sorbitol polyglycidyl ether, and the like.

Examples of the compound having one hydroxyl group and a double bond at the end of the molecule used in the present invention include α-olefin alcohols, such as 3-butene-1-ol, 5-hexene-1-ol, and the like; vinyl ethers, such as 2-hydroxyethyl vinyl ether, 2-hydroxypropyl vinyl ether, and the like; mono(meth)allyl ethers of alkylene glycols, such as (meth)allyl 2-hydroxyethyl ether, (meth)allyl 2-hydroxypropyl ether, (meth)allyl 3-hydroxypropyl ether, (meth)allyl 2-hydroxybutyl ether, (meth)allyl 3-hydroxybutyl ether, (meth)allyl 4-hydroxybutyl ether, (meth)allyl 6-hydroxyhexyl ether, and the like; and mono(meth)allyl ethers of polyoxyalkylene glycols, such as diethylene glycol mono(meth)allyl ether, dipropylene glycol mono(meth)allyl ether, and the like. As the epoxidizing agent used for epoxidizing the reaction product of the compound having one hydroxyl group and a double bond at the end of the molecule with the terminal isocyanate group of the prepolymer, conventional compounds, such as perbenzoic acid, peracetic acid, and the like, can be used.

In the preparation of the polyurethane resin used in the present invention, an organometallic compound, such as dibutyltin dilaurate or the like, may be added as the catalyst, if necessary. Antioxidants, ultraviolet absorbents, antihydrolysis agents, and the like, may be added for enhancing stability of the resin. As the method of preparation of the polyurethane resin of the present invention, conventional methods can be adopted. Examples of the conventional method of preparation include a method in which the reacting components are mixed sufficiently and injected into an extruder to effect the reaction, in the presence of a catalyst if necessary, and a method in which the reaction is effected as a solution in a solvent, such as dimethylformamide, toluene, xylene, benzene, dioxane, cyclohexane, methyl ethyl ketone, methyl isobutyl ketone, cyclohexanone, ethyl acetate, butyl acetate, or the like.

In the present invention, the reaction of synthesis of the prepolymer having isocyanate groups at the ends thereof is conducted generally at 60° to 120° C. The reaction of addition of the compound having one hydroxyl group and one or more epoxy groups to the terminal isocyanate group can be conducted at 80° C. or lower, preferably 40° to 60° C., in order to prevent ring-opening of the epoxy group.

The coating material containing dispersed inorganic powder of the present invention comprises the binder which comprises the polyurethane resin described above and an inorganic powder. The inorganic powder used in the present invention is not particularly limited, and coloring pigments, fillers, special functional pigments, magnetic powder, and the like, can be used. Examples of the coloring pigment include titanium oxide, zinc oxide, chrome yellow, yellow iron oxide, yellow ocher, titanium yellow, molybdate orange, red oxide, purple oxide, iron blue, ultramarine blue, cobalt blue, chrome green, chromium oxide, carbon black, black iron oxide, and the like. Examples of the filler include precipitated calcium carbonate, barium sulfate, talc, clay, white carbon, and the like. Examples of the special functional pigment include anti-corrosion pigments, such as zinc chromate, strontium chromate, red lead, lead suboxide, basic lead chrominate, lead cyanamide, calcium plumbate, zinc phosphate, aluminum phosphate, potassium phosphate, and the like; anti-fouling pigments which prevents adhesion of living things in the sea water, such as cuprous oxide, and the like; pigments providing metallic appearance to a coating layer, such as aluminum powder, and the like; and the like functional pigments.

As the magnetic powder used in the present invention, fine magnetic powder having a specific surface area of 30 to 70 m²/g is particularly preferable. Examples of such magnetic powder include powder of ferromagnetic iron oxides, such as $\gamma\text{-Fe}_2\text{O}_3$, $\gamma\text{-Fe}_3\text{O}_4$, $\gamma\text{-FeO}_x$ ($1.33<x<1.5$), and the like; powder of ferromagnetic iron oxides doped with Co; barium ferrite; powder of iron carbides, such as $\text{Fe}_5\text{C}_2$, and the like; powder of iron nitride, and powder of other ferromagnetic metals including iron, cobalt, and nickel. Examples of the powder of a ferromagnetic metal include alloys containing 75% by weight or more of a metal which, in turn, contains 80% by weight or more of at least one type of ferromagnetic metal or ferromagnetic alloy (such as Fe, Co, Ni, Fe—Co, Fe—Ni, Co—Ni, and Co—Ni—Fe) and may contain other components (such as Al, Si, S, Sc, Ti, V, Cr, Mn, Cu, Zn, Y, Mo, Rh, Pd, Bi, La, Ce, Pr, Nd, B, and P) in an amount in the range of less than 20% by weight. Method of preparation of such ferromagnetic powder is already known, and a magnetic powder prepared by a known method can be used as the magnetic powder of the present invention. Shape of the magnetic powder used in the present invention is not particularly limited, and magnetic powder in the shape of needles, particles, cubes, granules, or plates, can be used in general.

The total content of the binder in the coating material containing dispersed inorganic powder of the present invention is generally 10 to 100 parts by weight, preferably 15 to 40 parts by weight, per 100 parts by weight of the inorganic powder. When the total content of the binder is less than 10 parts by weight per 100 parts by weight of the inorganic powder, dispersion of the inorganic powder is insufficient, and the possibility that strength of the layer is decreased arises. When the total content of the binder is more than 100 parts by weight per 100 parts by weight of the inorganic powder, the possibility that the function of the inorganic powder is not sufficiently exhibited arises. As the binder for the inorganic powder in the coating material containing dispersed inorganic powder of the present invention, the polyurethane resin described above may be used singly or as a mixture with other types of binder.

In the present invention, examples of the other type of binder which may be used as a mixture with the polyurethane resin described above include thermoplastic resins and thermosetting resins. Examples of the thermoplastic resins include vinyl chloride polymers, such as vinyl chloride-vinyl acetate copolymers, vinyl chloride-vinyl acetate-maleic acid and/or (meth)acrylic acid copolymers, vinyl chloride-vinyl propionate copolymers, saponification products of vinyl chloride-carboxylic acid vinyl ester copolymers, vinyl chloride-vinylidene chloride copolymers, vinyl chloride-acrylonitrile copolymers, vinyl chloride copolymers containing epoxy group and sulfuric acid group, and the like; styrene polymers, such as styrene-butadiene copolymers, styrene-butadiene-acrylonitrile copolymers, and the like; (meth)acrylate polymers, such as (meth)acrylic acid ester-acrylonitrile copolymers, (meth)acrylic acid ester-vinylidene chloride copolymers, (meth)acrylic acid ester-styrene copolymers, and the like; polyurethane resins; polyester resins; nylon-silicone resins; nitrocellulose-polyamide resins; polyvinyl fluoride; vinylidene chloride-acrylonitrile copolymers; butadiene-acrylonitrile copolymers; polyamide resins; polyvinyl butyral; cellulose derivatives (cellulose acetate butyrate, cellulose acetate propionate, cellulose diacetate, cellulose triacetate, nitrocellulose, and the like); chlorovinyl ether-acrylic acid ester copolymers;, various types of synthetic rubber; and the like. Examples of the thermosetting resin include phenol resins, phenoxy resins, urea resins, melamine resins, alkyd resins, silicone resins, acrylic reactive resins, epoxy-polyamide resins, nitrocellulose-melamine resin, and the like.

In the present invention, vinyl chloride polymers having an average degree of polymerization (measured according to the method of Japanese Industrial Standard K 6721) of 100 to 500, preferably 100 to 300, more preferably 100 to 200, and containing 0.1 to 20% by weight of epoxy group, and styrene polymers and (meth)acrylate polymers each having a number-average molecular weight (measured according to the same method as that applied to the polyurethane resin) of 5,000 to 50,000, preferably 10,000 to 40,000, more preferably 20,000 to 30,000, and containing 0.1 to 20% by weight of epoxy group, can be preferably used as the other type of binder which is used by mixing with the polyurethane resin, because dispersion of the inorganic powder is excellent and the coating layer obtained is tough. When the average degree of polymerization or the number-average molecular weight is less than the respective range specified above, strength of the coating layer is low even after it is crosslinked. When the average degree of polymerization or the number-average molecular weight is more than the respective range specified above, dispersion of inorganic powder is inferior. The content of epoxy group in each polymer is in the range of 0.1 to 20% by weight, preferably 1.0 to 15% by weight. When the content is less than 0.1% by weight, the crosslinking is insufficient. When the content is more than 20% by weight, mechanical properties of the resin deteriorate. In the present invention, it is necessary that at least 20% by weight of the polyurethane resin be contained in the mixture of the polyurethane resin and the other type of binder. The ratio by weight of the polyurethane resin to the other type of binder in the mixture is preferably 8:2 to 2:8, more preferably 7:3 to 3:7.

In the present invention, the vinyl chloride polymer, the styrene polymer, and the (meth)acrylate polymer described above are copolymers containing 20% by weight or more of the vinyl chloride monomer, the styrene monomer, and a (meth)acrylate monomer, respectively. The compositions of the copolymers are suitably selected in such a manner that homogeneous blends are obtained in the blending of the copolymers and the polyurethane resin by adjusting the compatibilities and softening points of the blended components. The (meth)acrylate monomer is an alkyl ester of acrylic acid or an alkyl ester of methacrylic ester in each of which the alkyl group has 1 to 5 carbon atoms, such as methyl acrylate, ethyl acrylate, propyl acrylate, butyl acrylate, 2-ethylhexyl acrylate, methyl methacrylate, ethyl methacrylate, propyl methacrylate, and the like.

The polymerization process to prepare the vinyl chloride polymer, the styrene polymer, or the (meth)acrylate polymer is not particularly limited, and any of the solution polymerization, the suspension polymerization, the emulsion polymerization, and the like process, may be used. The vinyl chloride polymer, the styrene polymer, or the (meth)acrylate polymer may be, for example, prepared by copolymerization of a monomer containing epoxy group with vinyl chloride, styrene, or a (meth)acrylate monomer, respectively. Other monomers may also be copolymerized in addition to the monomers described above in this copolymerization, if necessary.

A polymerization initiator is used in the polymerization. Examples of the polymerization initiator include an organic peroxide, such as lauroyl peroxide, diisopropyl peroxydicarbonate, di-2-ethylhexyl peroxydicarbonate, t-butyl peroxypivalate, 3,5,5-trimethylhexanoyl peroxide, and the like, an azo compounds, such as α,α'-azobisisobutyronitrile, and the like, ammonium persulfate, potassium persulfate, and the like,.

A suspending agent may be used in the suspension polymerization. Examples of the suspending agent include synthetic macromolecular substances, such as polyvinyl alcohol, a partial saponification product of polyvinyl acetate, a cellulose derivative like methyl cellulose, polyvinylpyrrolidone, maleic acid-vinyl acetate copolymer, polyacrylamide, and the like, and natural macromolecular substances, such as starch, gelatin, and the like. An emulsifier may be used in the emulsion polymerization. Examples of the emulsifier include anionic emulsifiers, such as a sodium alkylbenzenesulfonate, sodium laurylsulfate, and the like, and nonionic emulsifiers, such as polyoxyethylene alkyl ethers, partial esters of polyoxyethylenesorbitan fatty acids, and the like. A molecular weight modifier, such as trichloroethylene, thioglycol, dodecylmercaptan, or the like, may be used, if necessary.

The polymerization initiator, the monomer, the suspending agent, the emulsifier, and the molecular weight modifier described above, may be added to the polymerization system in the whole amount at the start of the polymerization, or in separate portions during the polymerization. The polymerization is generally conducted at a temperature of 35° to 80° C. with stirring.

In the present invention, the other type of binder described above may additionally contain other functional groups which themselves are generally known. It is particularly preferred that the other type of binder contains, among the functional groups which themselves are generally known, at least one of anionic hydrophilic groups which are selected from the group consisting of carboxyl group, acids containing sulfur or phosphorus, and salts of acids containing sulfur or phosphorus, and cationic hydrophilic groups which are selected from the group consisting of $-N^+R^1R^2R^3X^-$ and $-N^+R^1R^2 \cdot HX^1$, because dispersion of the inorganic powder is improved. In the formulae, $R^1$, $R^2$, and $R^3$ each represent an alkyl group, an alkenyl group, or an alkoxy group, and X and $X^1$ each represent a halogen, a residue group of an inorganic acid selected from sulfuric acid, phosphoric acid, and nitric acid, or a residue group of an organic acid selected from carboxylic acids, hydrogensulfuric acid esters, and hydrogenphosphoric acid esters.

Examples of the monomer used for incorporating the carboxyl group as the anionic hydrophilic group into the vinyl chloride polymer, the styrene polymer, or the (meth)acrylate polymer used in the present invention include unsaturated mono- or dicarboxylic acids, such as acrylic acid, methacrylic acid, maleic acid, itaconic acid, crotonic acid, vinyl acetate, and the like; and alkyl monoesters of unsaturated dicarboxylic acids, such as monomethyl maleate, mono-2-hydroxyethyl maleate, monobutyl itaconate, mono-2-hydroxypropyl itaconate, and the like. A radical polymerizable monomer having a residue group of an acid containing sulfur like sulfonic acid, sulfuric acid, or the like, an alkali metal salt thereof, or an ammonium salt thereof, may be used for incorporating the anionic hydrophilic group in the polymer described above. Examples of the radical polymerizable monomer having a residue group of sulfonic acid, an alkali metal salt thereof, or an ammonium salt thereof include acids, such as vinylsulfonic acid, methylvinylsulfonic acid, (meth)allylsulfonic acid, 2-sulfonic acid-ethyl (meth)acrylate, 2-acrylamido-2-methylpropanesulfonic acid, 3-allyloxy-2-hydroxypropanesulfonic acid, and the like, alkali salts thereof, and ammonium salts thereof. Examples of the radical polymerizable monomer having a residue group of sulfuric acid, an alkali metal salt thereof, or an ammonium salt thereof include acids, such as 2-sulfuric acid-ethyl (meth)acrylate, 3-allyloxy-2-hydroxypropanesulfuric acid, and the like, alkali metal salts thereof, and ammonium salts thereof. Among these compounds, the radical polymerizable monomers having a residue group of sulfonic acid or a salt thereof are easily available and also abundant in the type. A radical polymerizable monomer having a residue group of an acid containing phosphorus like phosphoric acid, phosphinic acid, or the like, an alkali metal salt thereof, or an ammonium salt thereof may also be used for incorporating the anionic hydrophilic group in the polymer described above. Examples of the radical-polymerizable monomer having a residue group of an acid containing phosphorus include acids, such as 3-chloro-2-phosphoric acid-propyl (meth)acrylate, 2-phosphoric acid-ethyl (meth)acrylate, 3-allyloxy-2-hydroxypropanephosphoric acid, and the like, alkali metal salts thereof, ammonium salts thereof, other acids, such as vinylphosphonic acid, acrylamidomethanephosphonic acid, 2-phosphonic acid-ethyl (meth)acrylate, 3-allyloxy-2-hydroxypropanephosphonic acid; alkali salts of the other acids; and ammonium salts of the other acids.

For preparation of the vinyl chloride polymer, the styrene polymer, or the (meth)acrylate polymer each having an anionic hydrophilic group, carboxylic acid or an alkali metal salt or an ammonium salt of an acid containing sulfur or phosphorus may be added to the part of the epoxy group in an aqueous or non-aqueous system during, before, or after the copolymerization reaction, when the vinyl chloride polymer is prepared by copolymerization of a monomer containing epoxy group with vinyl chloride. Examples of the alkali metal salt and an ammonium salt of an acid containing sulfur or phosphorus described above include potassium sulfite, sodium thiosulfate, ammonium hydrogensulfate, disodium hydrogenphosphate, ammonium hydrogenphosphite, potassium sulfanilate, potassium persulfate, sodium perphosphate, and the like. The method of addition of a strong acid containing sulfur or phosphorus in the copolymerization of the monomer containing epoxy group and vinyl chloride is described in detail in Japanese Patent Application Laid-Open Nos. Showa 60(1985)-238306, Showa 60(1985)-238371, and Showa 61(1986)-53367, U.S. Pat. No. 4,707,411, DE No. 3516781, and KR No. 67859.

The amount of the anionic hydrophilic group can be expressed by the equivalent which is the molecular weight of the vinyl chloride polymer per one anionic hydrophilic group. The amount is preferably in the range from 4,000 to 40,000. When the amount is less than 4,000, moisture resistance of the medium is decreased. When the amount is more than 40,000, dispersion of the magnetic powder is inferior.

The cationic hydrophilic group represented by the formula $-N^+R^1R^2R^3X^-$ can be incorporated into the vinyl chloride polymer, the styrene polymer, or the (meth)acrylate polymer of the present invention by suitable processes. One of such processes (the first process) includes copolymerization of a monomer having the quaternary ammonium salt represented by the above formula. The anionic group in the quaternary ammonium salt is a halogen or a residue group of an inorganic acid selected from sulfuric acid, phosphoric acid, and nitric acid, or a residue group of an organic acid selected from carboxylic acids, hydrogensulfuric acid esters, and hydrogenphosphoric acid esters. Examples of the monomer having a quaternary ammonium salt used in the present invention include diallyldimethylammonium chloride, diallyldimethylammonium stearate, 2-hydroxy-3-allyloxypropyltrimethylammonium chloride, 2-hydroxy-3-allyloxypyldimethylstearylammonium acetate, vinylbenzyltrimethylammonium chloride, (meth)acryloyloxyethyltrimethylammonium chloride, 2-hydroxy-3-methacryloyloxypropyltrimethylammonium chloride, (meth)acryloyloxypropyldimethylbenzyl chloride, (meth)acrylamidopropyltrimethylammonium chloride, and the like.

Another of such processes for incorporating the quaternary ammonium salt represented by the formula described above into the vinyl chloride polymer in the present invention includes bringing a vinyl chloride polymer containing epoxy group into reaction with a tertiary amine in the presence or absence of an acid (the second process). This process is described in detail in Japanese Patent Application Laid-Open No. Showa 63(1988)-121117.

For incorporating the salt of a tertiary amine represented by the formula $-N^+R^1R^2 \cdot HX^1$ into the vinyl chloride polymer, the styrene polymer, or the (meth)acrylate polymer, copolymerization of a monomer containing a salt of a tertiary amine is generally conducted. As the monomer containing a salt of a tertiary amine, N,N-diethyl-N'-(meth)acryloylethylenediamine acetate, N,N-diethyl-N'-(meth)acryloyl-1,3-propylenediamine benzenesulfonate, N,N-diethyl-N'-(meth)acryloyl-1,3-propylenediamine diethylsulfonate, or the like, can be used.

The cationic hydrophilic group used in the present invention is contained in the vinyl chloride polymer, the styrene polymer, or the (meth)acrylate polymer preferably in such an amount that the content of nitrogen is in the range from 0.02 to 0.5% by weight. When the content is less than 0.02% by weight, dispersion of the magnetic powder is inferior. When the content is more than 0.5% by weight, moisture resistance deteriorates.

As described above, other monomers may be used in the copolymerization of a monomer containing epoxy group with vinyl chloride, styrene, or a (meth)acrylate monomer, to prepare the vinyl chloride polymer, the styrene polymer, or the (meth)acrylate polymer in the present invention, if necessary. Examples of such monomer include vinyl esters of carboxylic acids, such as vinyl acetate, vinyl propionate, and the like; vinyl ethers, such as methyl vinyl ether, isobutyl vinyl ether, cetyl vinyl ether, and the like; vinylidene compounds, such as vinylidene chloride, vinylidene fluoride, and the like; unsaturated carboxylic acid anhydrides, such as maleic anhydride, itaconic anhydride, and the like; alkyl esters of unsaturated carboxylic acids, such as diethyl maleate, dibutyl maleate, diethyl itaconate, methyl (meth)acrylate, ethyl (meth)acrylate, and the like; unsaturated nitriles, such as acrylonitrile, and the like; and aromatic vinyl monomers, such as styrene, α-methylstyrene, p-methylstyrene, and the like.

The contents of the vinyl chloride monomer, the styrene monomer, and the (meth)acrylate monomer, in the vinyl chloride polymer, the styrene polymer, and the (meth)acrylate polymer, respectively, are generally 20% by weight or more, preferably from 50 to 95% by weight. When the content is less than 20% by weight, strength of the corresponding polymer is decreased and durability is lost.

In the present invention, as the crosslinking agent for the polyurethane resin used as the binder, or as the crosslinking agent for a combination of the polyurethane resin and other types of binder containing epoxy group when they are used together, a conventional crosslinking agent or a conventional crosslinking accelerator for the epoxy crosslinking, such as an amine compound, a thiol compound, an organic acid, an acid anhydride, or an aminosilane compound, can be used. Examples of the amine crosslinking agent include aliphatic polyamines, such as ethylenediamine, diethylenetriamine, triethylenetetramine, tri(methylamino)hexane, and the like; and aromatic polyamines, such as meta-phenylenediamine, 4,4'-diaminodiphenylmethane, and the like. Examples of the thiol crosslinking agent include thiol compounds, such as mercaptopropionic acid esters, thiol compounds obtained from polyepoxides, and the like; mixtures of the thiol compound with a tertiary amine as the catalyst; and triazine polythiols, such as dibutylaminotriazinedithiol, triazinetrithiol, and the like. Examples of the acid anhydride crosslinking agent include aliphatic acid anhydrides, such as alkylsuccinic anhydride, polyadipic acid anhydride, and the like; alicyclic acid anhydrides, such as methyltetrahydrophthalic anhydride, methylhexahydrophthalic anhydride, methylcarbic anhydride, hexahydrophthalic anhydride, tetrahydrophthalic anhydride, trialkyltetrahydrophthalic anhydrides, methylcyclohexenedicarboxylic acid anhydride, and the like; and aromatic acid anhydrides, such as trimellitic anhydride, pyromellitic anhydride, and the like. Other crosslinking agents, such as crosslinking agents of polyamides, crosslinking agents of phenols, substituted imidazoles, aminosilanes such as γ-aminopropyltriethoxysilane and the like, can be used as well. The crosslinking can be formed more efficiently when an accelerator or a catalyst, such as a tertiary amine, is used in combination with the crosslinking agent. A conventional crosslinking agent of polyisocyanates may used in addition to the crosslinking agent for epoxy group described above for the purpose of crosslinking hydroxyl groups which are formed by the ring opening of the epoxy group in the crosslinking reaction, or crosslinking hydroxyl groups supplied by using another resin having hydroxyl group in combination.

In a mode of the present invention, a combination of the polyurethane resin having terminal epoxy groups described above and the vinyl chloride polymer having epoxy group described above is used as the binder, and the binder is crosslinked mainly through the epoxy groups. This crosslinking may be formed between the polyurethane resin molecules, between the polyurethane resin molecule and the vinyl chloride polymer molecule, and/or between the vinyl chloride polymer molecules. In the actual condition, it is considered that mixed crosslinkings are formed.

When the combination of the polyurethane resin having terminal epoxy groups described above and the vinyl chloride polymer having epoxy group described above is used as the binder for magnetic powder in the present invention as described above, it is particularly preferable that the alicyclic acid anhydride described above is used as the crosslinking agent and a tertiary amine is used as the catalyst for the crosslinking with epoxy groups. The alicyclic acid anhydride is suitable with respect to solubility in solvents, compatibility with the binder, and the property of sublimation. A hard magnetic coating layer exhibiting good elongation can be obtained, and an excellent running property and durability at a high temperature can be achieved.

The alicylic acid anhydride is used in such an amount that the ratio by mol M of the alicylic acid anhydride to the total epoxy group in all the binders is from 0.3 to 1.0, preferably from 0.4 to 0.8. When M is smaller than 0.3, the crosslinking is insufficient. When M is larger than 1.0, durability of the magnetic recording medium tends to have a disadvantageous effect by corrosion of the magnetic head caused by an excess amount of the crosslinking agent and also by formation of excessively tight crosslinking.

Examples of the tertiary amine used as the catalyst for the crosslinking reaction include monoamines, such as N,N'-dimethylcyclohexylamine, benzyldimethylamine, and the like; diamines, such as N,N,N',N'-tetramethylethylenediamine, N,N,N',N'-tetramethylhexane-1,6-diamine, and the like; triamines, such as N,N,N',N',N'',N''-pentamethyldiethylenetriamine, N,N,N',N',N'',N''-pentamethylpropylenetriamine, and the like; cyclic amines, such as triethylenediamine(1,4-diazabicyclo-(2,2,2)-octane), N,N'-dimethylpiperadine, N-methyl-N'-(2-dimethylamino)ethylpiperadine, 1,8-diazabicyclo(5,4,0)-undeca-7-ene, and the like; alcohol amines, such as dimethylaminoethanol, triethanolamine, dimethylaminoethoxyethanol, and the like; and ether amines, such as bis(2-dimethylaminoethyl) ether.

The tertiary amine is used in such an amount that the ratio by mol N of the tertiary amine to the cyclic acid anhydride described above is from 0.10 to 0.28, preferably from 0.14 to 0.24. When N is smaller than 0.10, the crosslinking tends to be insufficient. When N is larger than 0.28, excessively tight crosslinking is formed, and durability of the magnetic recording medium is decreased.

To the coating material containing dispersed inorganic powder of the present invention, lubricants, polishing agents, antistatic agents, fungicides, dispersants, and the like, may be added, if necessary.

As the lubricant, a fatty acid containing an alkyl group having 8 to 18 carbon atoms, a higher alcohol, an amide, or a fatty acid ester, can be used. Examples of the lubricant include caprylic acid, capric acid, lauric acid, myristic acid, palmitic acid, stearic acid, oleic acid, eraidic acid, linolic acid, linolenic acid, stearolic acid, stearyl alcohol, palmityl alcohol, laurylamide, dimethylstearylamide, butyllaurylamide, butyl stearate, octyl stearate, sorbitan oleate, and the like. Other examples of the lubricant include fluoro-oils, such as polyperfluoroalkylene oxide, perfluoroalkane, and the like; and solid lubricants, such as silicone oils, paraffin wax, polyethylene oxide, carbon black, graphite, molybdenum disulfide, tungsten disulfide, and the like. The lubricant can be used in an amount of 1 to 6 parts by weight per 100 parts by weight of the inorganic powder.

Examples of the polishing agent include $TiO_2$, $TiO$, $ZnO$, $CaO$, $SnO_2$, $SiO_2$, $\alpha$-$Fe_2O_3$, $Cr_2O_3$, $\alpha$-$Al_2O_3$, $ZnS$, $MoS_2$, $BaSO_4$, $CaSO_4$, $MgCO_3$, $BN$, $SiC$, and the like. The polishing agent may be used singly or as a mixture of two or more types.

Examples of the antistatic agent include electric conductive fine powder, such as carbon black, carbon black grafted polymers, and the like; natural surfactants, such as saponine, and the like; nonionic surfactants, such as alkylene oxide surfactants, glycerol surfactants, glycidol surfactants, and the like; cationic surfactants, such as higher alkylamines, quaternary ammonium salts, salts of pyridine and other heterocyclic compounds, phosphoniums, sulfoniums, and the like; anionic surfactants containing acid groups, such as carboxylic acid groups, sulfonic acid groups, phosphoric acid groups, sulfuric acid ester groups, phosphoric acid ester groups, and the like; and amphoteric surfactants, such as amino acids, aminosulfonic acids, sulfuric acid esters of aminoalcohols, and phosphoric acid esters of aminoalcohols.

To the coating material containing dispersed inorganic powder of the present invention, a dispersant may be added, if necessary. Examples of the dispersant include fatty acids having 10 to 22 carbon atoms, such as caprylic acid, capric acid, lauric acid, myristic acid, palmitic acid, stearic acid, oleic acid, eraidic acid, linolic acid, linolenic acid, stearolic acid, and the like; metal soaps made from the fatty acids described above and alkali metals, such as lithium, sodium, potassium, and the like, or alkaline earth metals, such as magnesium, calcium, barium, and the like; esters of the fatty acids described above; compounds obtained by replacing a part or whole of the hydrogen atoms in the esters described above or compounds thereof with fluorine atoms; amides of the fatty acids described above; aliphatic amines; higher alcohols; alkylphosphoric acid esters of polyalkylene oxides; alkylphosphoric acid esters; alkylboric acid esters; sarcosinates; alkyl ether esters; trialkylpolyolefinoxy quaternary ammonium salts; lecithin; and the like.

The solvent used in the coating material containing dispersed inorganic powder of the present invention is not particularly limited, and a conventional solvent for coating materials can be used. Examples of the solvent include ketones, such as acetone, methyl ethyl ketone, methyl isobutyl ketone, cyclohexanone, isophorone, diacetone alcohol, and the like; esters, such as ethyl acetate, butyl acetate, isobutyl acetate, and the like; aromatic compounds, such as benzene, toluene, xylene, ethylbenzene, chlorobenzene, and the like; alicyclic compounds, such as cyclohexane, ethylcyclohexane, and the like; alcohols, such as methanol, ethanol, isopropanol, butanol, isobutanol, 2-butanol, benzyl alcohol, cyclohexanol, and the like; ethers, such as cellosolve, butylcellosolve, cellosolve acetate, Carbitol acetate, 1,4-dioxane, tetrahydrofuran, and the like; N,N-dimethylformamide; 2-nitropropane; mineral spirit; and the like. The solvent may be used singly or as a mixture of two or more types. Mixed solvents containing ketones as the main components thereof are particularly advantageously used in the coating material containing dispersed inorganic powder of the present invention.

In the present invention, the magnetic coating material can be obtained by using a magnetic powder as the inorganic powder. The magnetic recording medium of the present invention can be produced by applying the magnetic coating material described above to a non-magnetic substrate; treating the coated material with the polarization in a magnetic field and surface-forming operations; heat treating for the crosslinking; treating the obtained material with the polishing of the surface, if necessary; cutting the material; and assembling the components. The non-magnetic substrate is not particularly limited. A material can be selected according to desire from materials conventionally used for magnetic recording media, such as polyester films (a polyethylene terephthalate film, a polyethylene naphthalate film, and the like), polypropylene film, cellulose triacetate film, cellulose diacetate film, polycarbonate film, and the like, each having about 3 to 200 µm thickness. Biaxially stretched polyester films are particularly advantageously used among these films. In the magnetic recording medium of the present invention, the magnetic layer comprises, as the binder, the crosslinked product of the polyurethane resin described above or the blend of the polyurethane resin and the other types of binder described above. The magnetic recording medium has the excellent magnetic properties because of the excellent dispersion of the magnetic powder, and also has the excellent durability and running property. Particularly when fine magnetic powder having a large specific surface area is used in order to satisfy the requirement for achieving a high S/N ratio, still more excellent dispersion, magnetic properties, durability, and running property can be realized by using a combination of the polyurethane resin with the other type of binder which is the vinyl chloride polymer, the styrene polymer, or the (meth)acrylate polymer, each having a specified molecular weight and containing epoxy group and an anionic or cationic hydrophilic group, according to the present invention To summarize the advantages of the present invention, a coating material containing fine inorganic powder dispersed with stability therein and having a low viscosity can be obtained by using, as the binder, the polyurethane resin having terminal epoxy groups and one of a sulfonic acid salt group, a carboxylic acid salt group, and a quaternary ammonium salt group.

The magnetic recording material prepared by using magnetic powder as the inorganic powder and crosslinking the binder, has excellent dispersion of the magnetic powder and smoothness of the surface. Therefore, the magnetic recording medium has excellent magnetic properties, durability, and running properties.

EXAMPLES

The invention will be understood more readily with reference to the following examples; however, these examples are intended to illustrate the invention and are not to be construed to limit the scope of the invention.

In the following synthesis examples of polyurethane, a polyester is occasionally represented by "poly (X)/(Y) ester", wherein X represents a polyhydric alcohol, and Y represents a polybasic carboxylic acid.

Synthesis Example of Polyurethane 1

Into a 5 liter reactor which is equipped with a propeller for stirring, a thermometer, and a condenser, and a temperature controller, 500 g of methyl ethyl ketone, 300 g (0.2 mol) of poly (1,4-butylene/neopentyl)/(adipic acid/dimethyl 5-sodiumsulfoisophthalate) ester having a molecular weight of 1500, 191.4 g (1.1 mol) of 2,4-TDI, and 225 g (0.9 mol) of MDI, were placed, and the reaction was allowed to proceed at 80° C. for 2 hours. Then, 2000 g of a 40% methyl ethyl ketone solution of polybutylene adipate having a molecular weight of 1000 (the solution containing 0.8 mol of polybutylene adipate) was added to the reaction solution, and the reaction was allowed to proceed for 2 hours. To the reaction solution, 130 g of a 10% methyl ethyl ketone solution of trimethylolpropane (the solution containing 0.097 mol of trimethylolpropane) was added. The reaction was allowed to proceed for 6 hours, and an isocyanate terminated prepolymer was prepared. To this polymer solution, 253 g of a 50% methyl ethyl ketone of 2,3-epoxy-1-propanol (the solution containing 1.71 mol of 2,3-epoxy-1-propanol) was added. The reaction was allowed to proceed at 40° C. for 15 hours, and polyurethane resin B was obtained. Other samples were also prepared similarly. To prepolymers prepared by adding 0, 280, 400, and 480 g of the 10% methyl ethyl ketone solution of trimethylolpropane in place of 130 g of the same solution, 296, 203, 164, and 137 g, respectively, of a 50% methyl ethyl ketone solution of 2,3-epoxy-1-propanol were allowed to react in place of 253 g of the same solution by the same procedures as those described above, and polyurethane resins A, C, D, and E, respectively, were obtained. Properties of the polyurethane resins of polyurethane obtained are shown in Table 1.

Synthesis Example of Polyurethane 2

Into the same apparatus as that used in Synthesis Example of Polyurethane 1, 500 g of methyl ethyl ketone, 900 g (0.75 mol) of an ester having a molecular weight of 1200 which was obtained by adding a sulfonic acid salt group to poly (neopentyl)/(isophthalic acid/fumaric acid) ester by using sodium hydrogensulfite, 208.8 g (1.2 mol) of 2,4-TDI, and 225 g (0.9 mol) of MDI were placed, and the reaction was allowed to proceed at 80° C. for 2 hours. Then, 750 g of a 40% methyl ethyl ketone solution of polybutylene adipate having a molecular weight of 600 (the solution containing 0.5 mol of polybutylene adipate) was added, and the reaction was allowed to proceed for 2 hours. To the reaction solution, 320 g of a 10% methyl ethyl ketone solution of trimethylolpropane (the solution containing 0.24 mol of trimethylolpropane) was added. The reaction was allowed to proceed for 6 hours, and an isocyanate terminated prepolymer was prepared. To this polymer solution, 400 g of a 50% methyl ethyl ketone of glycerol diglycidyl ether (the solution containing 1.0 mol of glycerol diglycidyl ether) was added. The mixture was allowed to react at 40° C. for 15 hours, and polyurethane resin F was obtained. Properties of the polyurethane resin obtained are shown in Table 1.

Synthesis Example of Polyurethane 3

Into the same apparatus as that used in Synthesis Example of Polyurethane 1, 500 g of methyl ethyl ketone, 900 g (0.75 mol) of the ester containing sulfonic acid salt group used in Synthesis Example of Polyurethane 2, and 225 g (0.9 mol) of MDI were placed, and the reaction was allowed to proceed at 80° C. for 2 hours. Then, 163 g of a 40% methyl ethyl ketone solution of polybutylene adipate having a molecular weight of 600 (the solution containing 0.11 mol of polybutylene adipate) was added to the reaction solution, and the reaction was allowed to proceed for 2 hours. To this polymer solution, 12.3 g of a 50% methyl ethyl ketone solution of 2,3-epoxy-1-propanol (the solution containing 0.08 mol of 2,3-epoxy-1-propanol) was added. The reaction was allowed to proceed at 40° C. for 15 hours, and polyurethane resin G was obtained. Properties of the polyurethane resin obtained are shown in Table 1.

Synthesis Example of Polyurethane 4

Into the same apparatus as that used in Synthesis Example of Polyurethane 1, 1200 g of methyl ethyl ketone, 1044 g (6 mol) of 2,4-TDI, and 268 g (2 mol) of trimethylolpropane were placed, and the reaction was allowed to proceed at 60° C. for 5 hours. Then, 888 g of a 50% methyl ethyl ketone solution of 2,3-epoxy-1-propanol (the solution containing 2 mol of 2,3-epoxy-1-propanol) was added to the reaction solution. The reaction was allowed to proceed at 40° C. for 15 hours, and polyurethane resin H was obtained. Properties of the polyurethane resin obtained are shown in Table 1.

Synthesis Example of Polyurethane 5

Into the same apparatus as that used in Synthesis Example of Polyurethane 1, 3000 g of methyl ethyl ketone, 250 g (1 mol) of 2,4-TDI, and 960 g (0.96 mol) of polybutylene adipate having a molecular weight of 1000 were placed, and the reaction was allowed to proceed at 80° C. for 3 hours. Then, 11.8 g of a 50% methyl ethyl ketone solution of 2,3-epoxy-1-propanol (the solution containing 0.08 mol of 2,3-epoxy-1-propanol) was added to the reaction solution. The reaction was allowed to proceed at 40° C. for 15 hours, and polyurethane resin I was obtained. Properties of the polyurethane resin obtained are shown in Table 1.

Synthesis Example of Polyurethane 6

Into the same apparatus as that used in Synthesis Example of Polyurethane 1, 3000 g of methyl ethyl ketone, 41 g (0.24 mol) of hexamethylene diisocyanate, 900 g (0.25 mol) of poly (1,4-butylene/ethylene/bisphenol A)/(adipic acid/5-sodiumsulfoisophthalic acid) ester having a molecular weight of 3600, and 800 g (0.25 mol) of poly (ethylene)/(isophthalic acid/sebacic acid) ester having a molecular weight of 3200 were placed. The reaction was allowed to proceed at 80° C. for 8 hours, and polyurethane resin J was obtained. Properties of the polyurethane resin obtained are shown in Table 1.

Synthesis Example of Polyurethane 7

Into the same apparatus as that used in Synthesis Example of Polyurethane 1, 2300 g of cyclohexanone, 122 g (0.7 mol) of 2,4-TDI, 700 g (0.35 mol) of poly (ethylene/neopentyl)/(terephthalic acid/sebacic acid) ester having a molecular weight of 2000, 142 g (0.22 mol) of a glycol having a molecular weight of 634 which had been obtained by ring-opening addition of ε-caprolactone to diethylene glycol ester of 5-sodiumsulfoisophthalic acid, and 13.5 g (0.1 mol) of dimethylolpropionic acid were placed, and the reaction was allowed to proceed at 80° C. for 5 hours. Then, 19 g of a 50% cyclohexanone solution of 2,3-epoxy-1-propanol (the solution containing 0.13 mol of 2,3-epoxy-1-propanol) was added to the reaction solution. The reaction was allowed to proceed at 140° C. for 4 hours, and polyurethane resin K was obtained. Properties of the polyurethane resin obtained are shown in Table 1.

Synthesis Example of Polyurethane 8

Into the same apparatus as that used in Synthesis Example of Polyurethane 1, 500 g of methyl ethyl ketone, 191.4 g (1.1 mol) of 2,4-TDI, 225 g (0.9 mol) of MDI, and 400 g (0.2 mol) of poly (1,4-butylene/neopentyl)/(adipic acid/dimethyl 5-sodiumsulfoisophthalate) ester having a molecular weight of 2000 were placed, and the reaction was allowed to proceed at 80° C. for 2 hours. Then, 630 g of a 40% methyl ethyl ketone solution of polybutylene adipate having a molecular weight of 1000 (the solution containing 0.5 mol of polybutylene adipate) was added to the reaction solution, and the reaction was allowed to proceed for 2 hours. After the reaction, 630 g of a 10% methyl ethyl ketone solution of 1,4-butanediol (the solution containing 0.7 mol of 1,4-butanediol) was added to the reaction solution continuously in 2 hours. To the solution obtained, 180 g of a 10% methyl ethyl ketone solution of trimethylolpropane (the solution containing 0.13 mol of trimethylolpropane) was added. The reaction was allowed to proceed for 6 hours, and a prepolymer having terminal isocyanate groups was prepared. To this solution, 118 g of a 50% methyl ethyl ketone solution of 2,3-epoxy-1-propanol (the solution containing 0.80 mol of 2,3-epoxy-1-propanol) was added. The reaction was allowed to proceed at 40° C. for 15 hours, and polyurethane resin L was obtained. Properties of the polyurethane resin obtained are shown in Table 1.

Synthesis Example of Polyurethane 9

Into the same apparatus as that used in Synthesis Example of Polyurethane 1, 500 g of methyl ethyl ketone, 191.4 g (1.1 mol) of 2,4-TDI, 225 g (0.9 mol) of MDI, and 1000 g (0.5 mol) of poly (1,4-butylene/neopentyl)/(adipic acid/dimethyl 5-sodiumsulfoisophthalate) ester having a molecular weight of 2000 were placed, and the reaction was allowed to proceed at 80° C. for 2 hours. Then, 2250 g of a 40% methyl ethyl ketone solution of polybutylene adipate having a molecular weight of 1000 (the solution containing 0.9 mol of polybutylene adipate) was added to the reaction solution, and the reaction was allowed to proceed for 2 hours. After the reaction, 200 g of a 10% methyl ethyl ketone solution of trimethylolpropane (the solution containing 0.15 mol of trimethylolpropane) was added to the reaction solution. The reaction was allowed to proceed for 6 hours, and a prepolymer having terminal isocyanate groups was prepared. To this solution, 111.4 g of a 50% methyl ethyl ketone solution of 2,3-epoxy-1-propanol (the solution containing 0.75 mol of 2,3-epoxy-1-propanol) was added. The reaction was allowed to proceed at 40° C. for 15 hours, and polyurethane resin M was obtained. Properties of the polyurethane resin obtained are shown in Table 1.

Synthesis Example of Polyurethane 10

Into the same apparatus as that used in Synthesis Example of Polyurethane 1, 500 g of methyl ethyl ketone, 208.8 g (1.2 mol) of 2,4-TDI, 225 g (0.9 mol) of MDI, and 750 g (1.25 mol) of polybutylene adipate having a molecular weight of 600 were placed, and the reaction was allowed to proceed at 80° C. for 2 hours. Then, 320 g of a 10% methyl ethyl ketone solution of trimethylolpropane (the solution containing 0.24 mol of trimethylolpropane) was added to the reaction solution. The reaction was allowed to proceed for 6 hours, and a prepolymer having terminal isocyanate groups was prepared. To this prepolymer solution, 63.4 g (0.86) of 2,3-epoxy-1-propanol in which 20 g (0.13 mol) of sodium salicylate was dissolved was added. The reaction was allowed to proceed at 40° C. for 15 hours, and polyurethane resin N was obtained. Properties of the polyurethane resin obtained are shown in Table 1.

Synthesis Example of Polyurethane 11

Into the same apparatus as that used in Synthesis Example of Polyurethane 1, 500 g of methyl ethyl ketone, 208.8 g (1.2 mol) of 2,4-TDI, 225 g (0.9 mol) of MDI, and 750 g (1.25 mol) of polybutylene adipate having a molecular weight of 600 were placed, and the reaction was allowed to proceed at 80° C. for 2 hours. Then, 320 g of a 10% methyl ethyl ketone solution of trimethylolpropane (the solution containing 0.24 mol of trimethylolpropane) was added to the reaction solution. The reaction was allowed to proceed for 6 hours, and a prepolymer having terminal isocyanate groups was prepared. To this prepolymer solution, 228.2 g (1.0 mol) of glycerol diglycidyl ether was added. The reaction was allowed to proceed at 40° C. for 15 hours, and a polyurethane resin having terminal epoxy groups was prepared. To this polymer solution, 110 g of dimethylstearylamine and 25 g of acetic acid were added. After the reaction was allowed to proceed at 60° C. for 20 hours, the product was purified by reprecipitation in methanol, and polyurethane resin O was obtained. Properties of the polyurethane resin obtained are shown in Table 1.

TABLE 1

(Part 1)

| polyurethane resin | A | B | C | D | E | F | G | H |
|---|---|---|---|---|---|---|---|---|
| NCO/OH ratio by mol | 2.0 | 1.74 | 1.52 | 1.38 | 1.30 | 1.31 | 1.05 | 2.00 |
| ratio by mol of polyols[1)] | high only | 10.31 | 4.79 | 3.35 | 2.79 | 5.23 | high only | low only |
| number-average molecular weight | 1520 | 2020 | 2650 | 3860 | 5520 | 5010 | 28600 | 880 |
| number of terminal epoxy | 2.0 | 2.12 | 2.36 | 2.74 | 3.26 | 5.28 | 2.0 | 3.0 |

TABLE 1-continued

| group amount of epoxy group (% by wt.) | 5.67 | 4.80 | 3.82 | 3.05 | 2.54 | 5.08 | 0.30 | 14.7 |
|---|---|---|---|---|---|---|---|---|
| amount of hydroxyl group (% by wt.) | 0 | 0 | 0 | 0 | 0 | 0 | 0 | 0 |
| polar goup type[2] | sas | sas | sas | sas | sas | sas | sas | none |
| amount (% by wt.)[3] | 1.10 | 0.89 | 0.65 | 0.45 | 0.32 | 1.47 | 0.26 | 0 |

(Part 2)

| polyurethane resin | I | J | K | L | M | N | O | P |
|---|---|---|---|---|---|---|---|---|
| NCO/OH ratio by mol | 1.04 | 0.87 | 0.76 | 1.25 | 1.23 | 1.31 | 1.31 | 0.87 |
| ratio by mol of polyols[1] | high only | high only | 1.62 | 0.84 | 9.38 | 5.23 | 5.23 | 2.39 |
| number-average molecular weight | 30400 | 37000 | 48000 | 4400 | 7900 | 3500 | 4000 | 27000 |
| number of terminal epoxy group | 2.0 | 0 | 0 | 2.41 | 2.50 | 2.30 | 4.28 | 2OH groups[4] |
| amount of epoxy group (% by wt.) | 0.28 | 0 | 0 | 2.45 | 1.38 | 3.03 | 3.03 | — |
| amount of hydroxyl group (% by wt.) | 0 | 0.09 | 0.36 | 0 | 0 | 0 | 0.43 | 0.13 |
| polar goup type[2] | none | sas | sas | sas | sas | cas | qas | —SO$_3$Na |
| amount (% by wt.)[3] | 0 | 1.41 | 1.04 | 0.56 | 0.77 | 0.43 | 0.35 | 1.41 |

[1] Ratio by mol of the high molecular weight polyol and the low molecular weight polyol in the reaction of synthesis of the prepolymer. "high only" means the high molecular weight polyol only was used. "low only" means the low molecular weight polyol only was used.
[2] sas: sulfonic acid salt
cas: carboxylic acid salt
qas: quaternary ammonium salt
[3] The amount of a polar group was expressed by the amount of $SO_4^-$ for a sulfonic acid salt group, by the amount of $COO^-$ for a carboxylic acid salt group, and by the amount of $N^+$ for a quaternary ammonium salt.
[4] Polyurethane resin P is a conventional polyurethane resin containing two terminal hydroxyl groups and no terminal epoxy group.

Synthesis Example of Vinyl Chloride Polymer 1

Into a degassed polymerization reactor, 40 parts by weight of vinyl chloride, 12 parts by weight of allyl glycidyl ether, 10 parts by weight of vinyl acetate, 1 part by weight of sodium hydrogencarbonate, 150 parts by weight of de-ionized water, 2 parts by weight of azobisisobutyronitrile, 1 part by weight of polyoxyethylene stearyl ether, and 0.2 parts by weight of methylcellulose, were placed, and the polymerization was started at 60° C. When 3 hours had passed after the start of the polymerization, 38 parts by weight of vinyl chloride was continuously injected into the polymerization reactor in 7 hours, and the polymerization was allowed to proceed. When the inner pressure of the reactor decreased to 3 kg/cm$^2$G, the unreacted vinyl chloride was recovered. The polymer was de-watered, washed with de-ionized water, and dried, and sample (a) was obtained.

Synthesis Example of Vinyl Chloride Polymer 2

Into a polymerization reactor, 200 parts by weight of de-ionized water, 1 part by weight of sodium laurylsulfate, 1 part by weight of potassium hydrogencarbonate, and 6 parts by weight of potassium persulfate, were placed. After degassing the reactor, 30 parts by weight of allyl glycidyl ether and 70 parts by weight of vinyl chloride were added, and the polymerization was started by increasing the temperature to 60° C. When the inner pressure of the reactor decreased to 3.5 kg/cm$^2$G, the unreacted vinyl chloride was recovered. The polymer particles were coagulated by adding an aqueous solution of polyaluminum chloride. The polymer recovered was washed sufficiently with warm water, de-watered, and dried, and sample (b) was obtained.

Synthesis Example of Vinyl Chloride Polymer 3

Into a degassed polymerization reactor, 50 parts by weight of vinyl chloride, 2 parts by weight of monobutyl maleate, 20 parts by weight of vinyl acetate, 3 parts by weight of vinylcyclohexene monooxide, 1 part by weight of sodium hydrogencarbonate, 150 parts by weight of de-ionized water, 2 parts by weight of azobisisobutyronitrile, 1 part by weight of polyoxyethylene stearyl ether, and 0.2 parts by weight of methylcellulose, were placed, and the polymerization was started at 60° C. When 3 hours had passed after the start of the polymerization, 25 parts by weight of vinyl chloride was continuously injected into the polymerization reactor in 7 hours, and the polymerization was allowed to proceed. When the inner pressure of the reactor decreased to 4 kg/cm$^2$G, the unreacted vinyl chloride was recovered. The polymer was de-watered, washed with de-ionized water, and dried, and sample (c) was obtained.

Synthesis Example of Vinyl Chloride Polymer 4

Into a polymerization reactor, 30 parts by weight of allyl glycidyl ether, 3 part by weight of sodium laurylsulfate, 2 parts by weight of t-butyl hydroperoxide, 1 part by weight of sodium sulfite, 1.5 parts by weight of sodium hydroxide, and 300 parts by weight of de-ionized water were placed. After degassing the reactor, 70 parts by weight of vinyl chloride was added, and the polymerization was started at 55° C. When the inner pressure of the reactor decreased to 3 kg/cm²G, the unreacted vinyl chloride was recovered. Into the reactor, 30 parts by weight of dipotassium hydrogenphosphate, 15 parts by weight of tetrabutylammonium chloride, and 30 parts by weight of ethylene glycol dimethyl ether were added. The content was mixed by stirring at 70° C. for 6 hours. Then, the polymer particles were coagulated.

vinyl acetate-maleic acid terpolymer (f), a commercial vinyl chloride-vinyl acetate-vinyl alcohol terpolymer (g), and a commercial vinyl chloride copolymer containing —SO₄K group, epoxy group, and hydroxyl group (h).

TABLE 2

(Part 1)

|  | No. of Synthesis Example of Vinyl Chloride Polymer | | | |
|---|---|---|---|---|
|  | 1 | 2 | 3 | 4 |
| vinyl chloride polymer | (a) | (b) | (c) | (d) |
| average degree of polymerization | 240 | 150 | 180 | 170 |
| composition |  |  |  |  |
| ionic hydrophilic group |  |  |  |  |
| type | — | $-SO_4K$ | $-COOH$ | $-OPO(OK)_2$ |
| equivalent | — | 7400 | 6500 | 25000 |
| amount of epoxy group (% by wt.) | 3.2 | 6.3 | 1.0 | 4.8 |
| amount of vinyl chloride (% by wt.) | 80 | 75 | 78 | 75 |

(Part 2)

|  | No. of Synthesis Example of Vinyl Chloride Polymer | | | |
|---|---|---|---|---|
|  | 5 | | | |
| vinyl chloride polymer | (e) | (f) | (g) | (h) |
| average degree of polymerization | 150 | 400 | 430 | 300 |
| composition |  |  |  |  |
| ionic hydrophilic group |  |  |  |  |
| type | $-N^+R_3Cl^-$ | $-COOH$ | — | $-SO_4K$ |
| equivalent | 18000 | 12000 | — | 16000 |
| amount of epoxy group (% by wt.) | 5.6 | — | — | 3.0 |
| amount of vinyl chloride (% by wt.) | 74 | 86 | 91 | 83 |

(f) Trade name, Vinylite VMCH; a product of Union Carbide Corporation; a vinyl chloride-vinyl acetate-maleic acid copolymer.
(g) Trade name, Vinylite VAGH; a product of Union Carbide Corporation; a vinyl chloride-vinyl acetate-vinyl alcohol copolymer.
(h) Trade name, MR-110; a product of Nippon Zeon Co., Ltd.; a vinyl chloride copolymer containing —SO₄K group, epoxy group, and hydroxyl group.

The polymer recovered was washed sufficiently with warm water, de-watered, and dried, and sample (d) was obtained.

Synthesis Example of Vinyl Chloride Polymer 5

Into a polymerization reactor, 30 parts by weight of allyl glycidyl ether, 3 part by weight of sodium laurylsulfate, 2 parts by weight of t-butyl hydroperoxide, 1 part by weight of sodium sulfite, 1.5 parts by weight of sodium hydroxide, and 300 parts by weight of de-ionized water were placed. After degassing the reactor, 70 parts by weight of vinyl chloride was added, and the polymerization was started at 55° C. When the inner pressure of the reactor decreased to 6 kg/cm²G, 2 parts by weight of dimethylstearylamine was added with pressure, and the temperature was increased to 70° C. The reaction was allowed to proceed for 6 hours, and then the unreacted vinyl chloride was recovered. The polymer particles were coagulated by adding an aqueous solution of polyaluminum chloride. The polymer recovered was washed sufficiently with warm water, de-watered, and dried, and sample (e) was obtained.

Properties of the polymers obtained above are shown in Table 2 together with those of a commercial vinyl chloride- Synthesis Example of Styrene Polymer Into a polymerization reactor equipped with a stirrer, 500 parts by weight of de-ionized water, 20 parts by weight of styrene, 7 parts by weight of acrylonitrile, 25 parts by weight of allyl glycidyl ether, 3 parts by weight of sodium laurylsulfate, 2 parts by weight of sodium hydrogencarbonate, and 8 parts by weight of potassium persulfate, were placed. After degassing the reactor, temperature of the reaction mixture was increased to 60° C., and the polymerization was started. Immediately after the start of the polymerization, 35 parts by weight of styrene and 13 parts by weight of acrylonitrile were continuously injected into the reactor in 18 hours. After 20 hours, the reaction mixture was cooled, and polymer particles were coagulated by adding polyaluminum chloride to the polymerization solution. The polymer recovered was sufficiently washed with warm water, de-watered, and dried, and styrene polymer (i) was obtained. The resin obtained contained 65% by weight of the styrene unit, 3.1% by weight of epoxy group, and 0.9% by weight of the bound acid as SO₄, and had a number-average molecular weight of 25,000.

Synthesis Example of an Acrylate Polymer

Into a polymerization reactor equipped with a stirrer, 500 parts by weight of de-ionized water, 20 parts by weight of methyl methacrylate, 7 parts by weight of butyl acrylate, 25 parts by weight of allyl glycidyl ether, 3 parts by weight of sodium laurylsulfate, 2 parts by weight of sodium hydrogencarbonate, and 8 parts by weight of potassium persulfate, were placed. After degassing the reactor, temperature of the reaction mixture was increased to 60° C., and the polymerization was started. Immediately after the start of the polymerization, 35 parts by weight of methyl methacrylate and 13 parts by weight of butyl acrylate were continuously injected into the reactor in 18 hours. After 20 hours, the reaction mixture was cooled, and polymer particles were coagulated by adding polyaluminum chloride to the polymerization solution. The polymer recovered was sufficiently washed with warm water, de-watered, and dried, and acrylate polymer (j) was obtained. The resin obtained contained 86% by weight of the acrylate units, 3.3% by weight of epoxy group, and 0.9% by weight of the bound acid as $SO_4$, and had a number-average molecular weight of 21,000.

Properties of the materials used above and the polymers obtained above were evaluated according to the following methods,.

1) Reactivity

Into 400 parts by weight of methyl ethyl ketone, 100 parts by weight of a mixed binder containing the components in amounts proportional to the amounts shown in Table 3, 4, 5, or 6 was dissolved by stirring for 1 hour at a room temperature. To the solution thus obtained, a crosslinking agent shown in Table 3, 4, 5, or 6 was added, and mixed to obtain a solution. A sheet obtained by casting this solution on a glass plate was heated to 60° C. for 24 hours. Then, 0.5 g of the sheet was taken as a polymer by weighing accurately, and dipped into 50 g of teterahydrofuran. After the mixture was kept stirring for 24 hours, the insoluble portion was separated by filtration, washed, dried, and weighed accurately. Gel fraction was obtained from the amount obtained according to the following equation:

gel fraction=(weight of the insoluble part/weight of the polymer sheet)×100 (% by weight)

A higher value of the gel fraction shows a higher reactivity in the crosslinking of the binder.

2) Gloss

In a pressurized kneader, 100 parts by weight of powder of a ferromagnetic metal (reluctive force Hc, 1640 Oe; saturated magnetization σs, 122 emu/g; specific surface area 60 m²/g), binders of types and amounts shown in Table 3, 4, 5, or 6, 27 parts by weight of a mixed solvent of methyl ethyl ketone/toluene/cyclohexanone in a ratio by volume of 1/1/1, 2 parts by weight of carbon black, and 4 parts by weight of alumina were mixed together for 60 minutes. The mixture was diluted in the kneader with the mixed solvent having the same composition as that used above until the concentration of the solid components became 70% by weight. Then, 100 parts by weight of the mixed solvent described above, 2 parts by weight of myristic acid, and 1 part by weight of butyl stearate, were added to the mixture, and dispersed with a high shear rate for 2 hours. To the mixture obtained, 180 parts by weight of the mixed solvent described above and a crosslinking agent in an amount specified in Table 2, 3, 5, or 6 were added, and dispersed for 10 minutes to obtain a magnetic coating material. The magnetic coating material obtained was applied to a polyester film, treated with the polarization in a magnetic field, and dried. Using the magnetic coating layer thus obtained, reflectivity at a reflection angle of 60 degree was measured by using a gloss meter. A higher value of the reflectivity shows better dispersion of the magnetic powder in the binder.

3) Stability of Dispersion

The magnetic coating material used for the evaluation of gloss was applied to a polyester film after being left standing for 1 hour. The coating layer was treated with the polarization in a magnetic field, and dried. Using the magnetic layer thus obtained, reflectivity at a reflection angle of 60 degree was measured by using a gloss meter. A higher value of the reflectivity shows higher sustained stability of the dispersion.

4) Viscosity of Coating Material

Using the magnetic coating material used for the evaluation of gloss, viscosity of the coating material was measured at 23° C. by using a B-type viscometer, rotor No. 4, at 30 rpm. A higher viscosity means less easy handling of the magnetic coating material.

5) Rectangular Ratio

From the magnetic coating layer used for the evaluation of gloss, a polymer piece of 6 mm×6 mm square was cut out, and the rectangular ratio was measured with this polymer by using a measuring apparatus of magnetic properties. A higher value of the rectangular ratio means that the magnetic recording medium has a larger output power and less noise.

6) Durability

The magnetic coating layer used for the evaluation of gloss was treated with the smoothing operation by calender rolls. The magnetic coating layer was then brought into contact with a rotating drum of 60 mm diameter having an polishing tape [a product of Nippon Microcoating Co., Ltd.; particle diameter, 3 μm] attached on the surface thereof, and the drum was rotated at 150 rpm under a load of 100 g for 30 minutes. Degree of fouling formed by the magnetic coating material attached to the polishing tape was evaluated by visual observation, and classified into the following three classes: ○: no fouling; Δ: some fouling; x: much fouling.

7) Running Property

The magnetic coating layer used for the evaluation of gloss was treated in the same manner as that in the evaluation of durability. Force generated between the coating layer and the drum was measured by using a U-gauge at 65° C. in an atmosphere of a relative humidity of 80%. The result of the measurement was classified into the following three classes in the order of lower to higher running resistance: ○: low; Δ: medium; x: high.

Examples 1 to 13 and Comparative Examples 1 to 7

Magnetic coating materials and magnetic tapes were prepared by using polyurethane resins (A) to (O) described above, and evaluated according to the methods described above. Compositions of the binders prepared and results of the evaluation are shown in Tables 3 and 4.

TABLE 3

(Part 1)

| | Example No. | | | | | |
|---|---|---|---|---|---|---|
| | 1 | 2 | 3 | 4 | 5 | 6 |
| composition of binder (part by wt.) | | | | | | |
| polyurethane resin | C | D | E | F | F | L |
| | 12 | 12 | 12 | 10 | 10 | 10 |
| resin other than polyurethane resin | (h) | (h) | (h) | (h) | (h) | (h) |
| | 12 | 12 | 12 | 14 | 14 | 14 |
| crosslinking agent | ($L_1$) | ($L_1$) | ($L_1$) | ($L_2$) | ($L_2/L_4$) | ($L_3$) |
| (part by wt.) | 2.2 | 2.2 | 2.2 | 2 | 2/1 | 1.5 |
| gel fraction (% by wt.) | 90 | 93 | 93 | 90 | 92 | 90 |
| reflectivity (%) | 180 | 180 | 178 | 182 | 182 | 182 |
| reflectivity (%)[1)] | 178 | 179 | 178 | 180 | 179 | 180 |
| viscosity of coating material (centipoise) | 3300 | 3400 | 3600 | 3500 | 3500 | 3800 |
| rectangular ratio | 0.81 | 0.81 | 0.81 | 0.82 | 0.82 | 0.80 |
| durability | ○ | ○ | ○ | ○ | ○ | Δ |
| running property | ○ | ○ | ○ | ○ | ○ | ○ |

(Part 2)

| | Example No. | | | | | | |
|---|---|---|---|---|---|---|---|
| | 7 | 8 | 9 | 10 | 11 | 12 | 13 |
| composition of binder (part by wt.) | | | | | | | |
| polyurethane resin | M | D | E | N | O | C | D |
| | 10 | 10 | 24 | 10 | 10 | 10 | 10 |
| resin other than polyurethane resin | (h) | (k) | — | (h) | (h) | (i) | (j) |
| | 14 | 14 | | 14 | 14 | 14 | 14 |
| crosslinking agent | ($L_3$) | ($L_3/L_4$) | ($L_3$) | ($L_2$) | ($L_2$) | ($L_2$) | ($L_2$) |
| (part by wt.) | 1.5 | 1/1 | 1.5 | 2 | 2 | 2 | 2 |
| gel fraction (% by wt.) | 93 | 87 | 92 | 90 | 90 | 90 | 93 |
| reflectivity (%) | 178 | 178 | 180 | 180 | 180 | 185 | 180 |
| reflectivity (%)[1)] | 177 | 173 | 175 | 178 | 178 | 182 | 175 |
| viscosity of coating material (centipoise) | 4000 | 3500 | 2900 | 3500 | 3500 | 2000 | 2400 |
| rectangular ratio | 0.80 | 0.81 | 0.84 | 0.82 | 0.82 | 0.85 | 0.83 |
| durability | Δ | Δ | ○ | ○ | ○ | ○ | ○ |
| running property | ○ | ○ | ○ | ○ | ○ | ○ | ○ |

[1)] Measured with a coating layer obtained by using a coating material which had been left standing for 1 hour.
(h) Trade name, MR-110; a product of Nippon Zeon Co., Ltd.; a vinyl chloride copolymer containing —$SO_4K$ group, epoxy group, and hydroxyl group.
(k) Poly(1,4-butylene/neopentyl)/(adipic acid/dimethyl 5-sodium sulfoisophthlate) ester; number-average molecular weight, 13,000.
($L_1$) Trade name, ZISNET DB; a product of Sankyo Kasei C., Ltd.; 2-dibutylamino-4,6-mercapto-s-triazine.
($L_2$) A mixture, phthalic anhydride/triethylenediamine = 9/1 (ratio by weight).
($L_3$) Diethylenetriamine.
($L_4$) Trade name, Coronate L; a product of Nippon Polyurethane Kogyo Co., Ltd.; an adduct of trimethylolpropane and TDI.

TABLE 4

| | Comparative Example No. | | | | | | |
|---|---|---|---|---|---|---|---|
| | 1 | 2 | 3 | 4 | 5 | 6 | 7 |
| composition of binder (part by wt.) | | | | | | | |
| polyurethane resin | A | B | G | H | I | J | K |
| | 12 | 12 | 10 | 10 | 10 | 10 | 10 |
| resin other than polyurethane resin | (h) | (h) | (h) | (h) | (h) | (h) | (h) |
| | 12 | 12 | 14 | 14 | 14 | 14 | 14 |
| crosslinking agent | ($L_1$) | ($L_1$) | ($L_2$) | ($L_3$) | ($L_2/L_4$) | ($L_4$) | ($L_4$) |
| (part by wt.) | 2.2 | 2.2 | 2 | 1.5 | 2/1 | 3.6 | 3.6 |
| gel fraction | 32 | 68 | 70 | 87 | 82 | 72 | 85 |

TABLE 4-continued

|  | Comparative Example No. | | | | | | |
| --- | --- | --- | --- | --- | --- | --- | --- |
|  | 1 | 2 | 3 | 4 | 5 | 6 | 7 |
| (% by wt.) | | | | | | | |
| reflectivity (%) | 180 | 180 | 162 | 147 | 144 | 168 | 165 |
| reflectivity (%)[1] | 174 | 175 | 160 | 123 | 140 | 166 | 152 |
| viscosity of coating material (centipoise) | 3200 | 3200 | 4700 | 3800 | 5200 | 5800 | 6200 |
| rectangular ratio | 0.79 | 0.79 | 0.72 | 0.70 | 0.70 | 0.75 | 0.71 |
| durability | × | × | × | × | Δ | × | Δ |
| running property | × | Δ | × | Δ | × | Δ | Δ |

[1] Measured with a coating layer obtained by using a coating material which had been left standing for 1 hour.
(h) Trade name, MR-110; a product of Nippon Zeon Co., Ltd.; a vinyl chloride copolymer containing —SO$_4$K group, epoxy group, and hydroxyl group.
($L_1$) Trade name, ZISNET DB; a product of Sankyo Kasei Co., Ltd.; 2-dibutylamino-4,6-mercapto-s-triazine.
($L_2$) A mixture, phthalic anhydride/triethylenediamine = 9/1 (ratio by weight).
($L_3$) Diethylenetriamine.
($L_4$) Trade name, Coronate L; a product of Nippon Polyurethane Kogyo Co., Ltd.; an adduct of trimethylolpropane and TDI.

The results in Examples 1 to 9, 12, and 13 show that magnetic coating materials excellent in the reactivity of crosslinking, the dispersion of magnetic powder (gloss), and the stability of the dispersion, and having a low viscosity could be obtained by using polyurethane resin C, D, E, F, L, or M which contained 2.2 to 7.0 of terminal epoxy groups in one molecule in average and 0.1 to 5.0% by weight of $SO_3$— and had a number-average molecular weight of 2,000 to 10,000, as the binder for fine metal magnetic powder, and that the magnetic recording media obtained by using these magnetic coating materials are excellent in the rectangular ratio as well as in the running property and the durability. Polyurethane resin N containing 0.43% by weight as COO— of a carboxylic acid salt group used in Example 10 and polyurethane resin O containing 0.35% by weight as $N^+$ of a quaternary ammonium salt group used in Example 11 also showed the same effect as that shown by the polyurethane resins used in Examples 1 to 9.

In Example 6, polyurethane resin N containing a high molecular weight polyol and a low molecular weight polyol in a ratio by mol of less than 1 was used. In Example 7, polyurethane resin M containing a high molecular weight polyol and a low molecular weight polyol in a ratio by mol of more than 8 was used. Somewhat insufficient durability was obtained in these examples. As can be seen by comparing the results in Examples 2 and 8, durability of the magnetic recording medium was somewhat different depending on the type of the binder used in combination with polyurethane D.

In Comparative Example 1, polyurethane resin A containing less than 2.2 terminal epoxy groups in one molecule in average and having a number-average molecular weight of less than 2,000 was used, and the results obtained showed a lower gel fraction because of the insufficient reactivity, and the inferior durability and running property. In Comparative Example 2, polyurethane resin B containing less than 2.2 terminal epoxy groups in one molecule in average was used, and the results obtained showed an inferior running property and somewhat higher running resistance. In Comparative Example 3, polyurethane resin G containing less than 2.2 terminal epoxy groups in one molecule in average and having a number-average molecular weight of more than 10,000 was used, and the results obtained showed a lower gloss and a lower rectangular ratio of the coating layer because of the higher viscosity of the coating material and the inferior dispersion of the magnetic powder. The running property and the durability were also inferior. In Comparative Example 4, polyurethane resin H having a number-average molecular weight of less than 2,000 was used, and the results obtained showed a lower gloss and a lower rectangular ratio of the coating layer, inferior durability, and somewhat higher running resistance because of the inferior dispersion of the magnetic powder. In Comparative Example 5, polyurethane resin I containing less than 2.2 terminal epoxy groups in one molecule in average and no polar group and having a number-average molecular weight of more than 10,000 was used, and the results obtained showed a lower gloss and a lower rectangular ratio of the coating layer, somewhat inferior durability, and inferior running property because of the inferior dispersion of the magnetic powder. In Comparative Example 6, polyurethane resin J of a conventional type which had a number-average molecular weight of more than 10,000 and contained hydroxyl group but no terminal epoxy group was used, and the results obtained showed a lower gloss and a lower rectangular ratio of the coating layer, inferior durability, and somewhat higher running resistance because of the somewhat inferior dispersion of the magnetic powder. In Comparative Example 7, polyurethane resin K of a conventional type which had a number-average molecular weight of more than 10,000 and contained hydroxyl group but no terminal epoxy group was used, and the results obtained showed a somewhat lower gloss and a lower rectangular ratio of the coating layer, and somewhat inferior durability and running property because of the inferior dispersion of the magnetic powder.

Examples 14 to 19 and Comparative Examples 8 to 15

Magnetic coating materials and magnetic tapes were prepared by using polymers (a) to (g) described above, and evaluated according to the methods described above. Compositions of the binders prepared and results of the evaluation are shown in Tables 5 and 6.

TABLE 5

|  | Example No. | | | | | |
| --- | --- | --- | --- | --- | --- | --- |
|  | 14 | 15 | 16 | 17 | 18 | 19 |
| composition of binder (part by wt) | | | | | | |
| polyurethane resin | C | C | D | E | F | F |
|  | 10 | 10 | 10 | 10 | 10 | 10 |
| vinyl chloride polymer | (a) | (b) | (c) | (d) | (e) | (b) |
|  | 10 | 14 | 14 | 14 | 14 | 14 |

TABLE 5-continued

|  | Example No. | | | | | |
|---|---|---|---|---|---|---|
|  | 14 | 15 | 16 | 17 | 18 | 19 |
| crosslinking agent (part by wt.) | ($L_1$) 2.2 | ($L_3$) 0.9 | ($L_3$) 0.9 | ($L_2$) 2.2 | ($L_5$) 3.6 | ($L_6$) 2 |
| gel fraction (% by wt.) | 90 | 92 | 90 | 93 | 93 | 95 |
| reflectivity (%) | 100 | 191 | 189 | 188 | 189 | 191 |
| reflectivity (%)[1] | 80 | 189 | 185 | 185 | 185 | 190 |
| viscosity of coating material (centipoise) | 2100 | 2200 | 2500 | 2400 | 2100 | 2300 |
| rectangular ratio | 0.82 | 0.87 | 0.86 | 0.86 | 0.86 | 0.88 |
| durability | ○ | ○ | ○ | ○ | ○ | ○ |
| running property | ○ | ○ | ○ | ○ | ○ | ○ |

[1] Measured with a coating layer obtained by using a coating material which had been left standing for 1 hour.
($L_1$) Trade name, ZISNET DB; a product of Sankyo Kasei C., Ltd.; 2-dibutylamino-4,6-mercapto-s-triazine.
($L_2$) A mixture, phthalic anhydride/triethylenediamine = 9/1 (ratio by weight).
($L_3$) Diethylenetriamine.
($L_4$) Trade name, Coronate L; a product of Nippon Polyurethane Kogyo Co., Ltd.; an adduct of trimethylolpropane and TDI.
($L_5$) Trade name, TSL-8331; a product of Toshiba Silicone Co., Ltd; 3-aminopropyltriethoxysilane.
($L_6$) 1,6-hexanediamine.

Coating materials excellent in the reactivity in crosslinking, the dispersion of the magnetic powder (gloss), and the stability of the dispersion and having the low viscosity could be obtained by using polyurethane resin C, D, E, or F containing 2.2 to 7.0 terminal epoxy groups in one molecule in average and 0.1 to 5.0% by weight as $SO_3$— of sulfonic acid salt group and having a number-average molecular weight of 2,000 to 10,000 in combination with vinyl chloride polymer (a), (b), (c), (d), or (e) containing 0.1 to 20% by weight of epoxy group as the binder for dispersing fine metal magnetic powder (Examples 12 to 17). Magnetic recording media prepared by using these coating materials were excellent in the rectangular ratio, the running property, and the durability (Examples 12 to 17). When polyurethane resin C described above was used for dispersing iron oxide coated with cobalt in combination with vinyl chloride polymer (i) having no ionic hydrophilic group, the rectangular ratio was improved to a somewhat smaller degree. The lower value of the gloss was caused by somewhat larger roughness of the magnetic powder.

When polyurethane resin A, B, or G containing less than 2.2 terminal epoxy groups in one molecule was used in combination with a vinyl chloride polymer having epoxy group and ionic hydrophilic group, the reactivity of the crosslinking was insufficient, and only magnetic recording media having inferior running property and durability were obtained (Comparative Examples 9 to 11). When polyurethane resin H or I containing no $SO_3$— group was used in combination with a vinyl chloride polymer having epoxy group and ionic hydrophilic group, the dispersion of the magnetic powder was inferior, and the inferior dispersion caused decrease in the rectangular ratio, the running property, and the durability. Polyurethane resin A and H having a number-average molecular weight of less than 2,000 showed adverse effects on the dispersion of magnetic powder and the durability. Polyurethane resin G and I having a number-average molecular weight of more than 10,000 provided the coating materials of a high viscosity, and caused inferior dispersion of the magnetic powder, and accordingly decrease in the rectangular ratio, the running property, and the durability. Polyurethane resin J containing no terminal epoxy group and a small amount of hydroxyl group gave rise to an insufficient crosslinking reaction and an inferior durability. Polyurethane resin K containing a large amount of hydroxyl group provided the coating mate-

TABLE 6

|  | Comparative Example No. | | | | | | | |
|---|---|---|---|---|---|---|---|---|
|  | 8 | 9 | 10 | 11 | 12 | 13 | 14 | 15 |
| composition of binder (part by wt.) | | | | | | | | |
| polyurethane resin | K | A | B | G | H | I | J | K |
|  | 10 | 10 | 10 | 10 | 10 | 10 | 10 | 10 |
| vinyl chloride polymer | (g) | (d) | (e) | (b) | (c) | (b) | (f) | (g) |
|  | 10 | 14 | 14 | 14 | 14 | 14 | 14 | 14 |
| crosslinking agent | ($L_4$) | ($L_3$) | ($L_3$) | ($L_2$) | ($L_5$) | ($L_6$) | ($L_4$) | ($L_4$) |
| (part by wt.) | 3.6 | 0.9 | 0.9 | 2.2 | 3.6 | 2 | 3.6 | 3.6 |
| gel fraction (% by wt.) | 88 | 45 | 70 | 75 | 90 | 83 | 38 | 90 |
| reflectivity (%) | 90 | 186 | 188 | 157 | 143 | 150 | 154 | 145 |
| reflectivity (%)[1] | <30 | 180 | 183 | 154 | 120 | 145 | 142 | 120 |
| viscosity of coating material (centipoise) | 4500 | 2200 | 2100 | 3000 | 2800 | 3500 | 8200 | 7300 |
| rectangular ratio | 0.77 | 0.83 | 0.83 | 0.73 | 0.73 | 0.73 | 0.74 | 0.72 |
| durability | Δ | × | × | × | × | × | × | × |
| running property | × | × | × | × | Δ | × | × | Δ |

[1] Measured with a coating layer obtained by using a coating material which had been left standing for 1 hour.

rial of a high viscosity even though a good crosslinking reactivity was obtained, and caused inferior dispersion, and accordingly decrease in the rectangular ratio, the running property, and the durability.

Examples 20 to 29 and Comparative Examples 16 to 24

In a pressurized kneader, 100 parts by weight of powder of a ferromagnetic metal (Hc, 1640 Oe; saturated magnetization σs, 122 emu/g; specific surface area 60 m²/g), binders of types and amounts shown in Table 7, 27 parts by weight of a mixed solvent of methyl ethyl ketone/toluene/cyclohexanone in a ratio by volume of 1/1/1, 2 parts by weight of carbon black, and 4 parts by weight of alumina, were mixed together for 60 minutes. The mixture was diluted in the kneader with the mixed solvent having the same composition as that used above until the concentration of the solid components becomes 70% by weight. Then, 100 parts by weight of the mixed solvent described above, 2 parts by weight of myristic acid, and 1 part by weight of butyl stearate were added to the mixture, and dispersed under a high shear rate for 2 hours. To the mixture obtained, 180 parts by weight of the mixed solvent described above, and a crosslinking agent and a catalyst according to Table 7 were added, and dispersed for 10 minutes to obtain a magnetic coating material. The magnetic coating material was applied to a polyester film, treated with the polarization in a magnetic field, and dried. The coating film was treated with the smoothing operation by using calender rolls, and then crosslinked at 60° C. for 24 hours.

was treated with the polarization in a magnetic field and dried. Reflectivity at a reflection angle of 60° of the magnetic coating film was measured by using a gloss meter. A higher reflectivity shows better dispersion of the binder. The reflectivity was also measured similarly with a coating material which had been left standing for 24 hours. When the difference of the reflectivity of the latter coating film from that of the coating film made immediately after the preparation of the coating material was 3% or less, the result is shown by the mark ○. When the difference was more than 3%, the result is shown by the mark x.

3) Running Property Test

The running property was evaluated by the kinematic friction coefficient. The magnetic layer of a magnetic tape

TABLE 7

|  | polyurethane resin | | vinyl chloride polymer | | crosslinking agent | | | catalyst | | |
| --- | --- | --- | --- | --- | --- | --- | --- | --- | --- | --- |
|  | type | amount (part by wt.) | type | amount (part by wt.) | type | amount (part by wt.) | M | type | amount (part by wt.) | N |
| Example | | | | | | | | | | |
| 20 | (D) | 9.6 | (a) | 14.4 | (1) | 1.45 | 0.50 | (6) | 0.23 | 0.23 |
| 21 | (D) | 9.6 | (b) | 14.4 | (2) | 2.34 | 0.50 | (6) | 0.36 | 0.23 |
| 22 | (E) | 9.6 | (c) | 14.4 | (3) | 0.69 | 0.50 | (6) | 0.12 | 0.23 |
| 23 | (E) | 9.6 | (d) | 14.4 | (1) | 1.34 | 0.37 | (6) | 0.21 | 0.23 |
| 24 | (N) | 9.6 | (e) | 14.4 | (1) | 3.18 | 0.75 | (6) | 0.49 | 0.23 |
| 25 | (P) | 9.6 | (h) | 14.4 | (1) | 3.76 | 1.00 | (6) | 0.58 | 0.23 |
| 26 | (D) | 9.6 | (b) | 14.4 | (1) | 2.32 | 0.50 | (6) | 0.16 | 0.10 |
| 27 | (E) | 9.6 | (c) | 14.4 | (1) | 0.75 | 0.50 | (6) | 0.12 | 0.23 |
| 28 | (D) | 7.2 | (b) | 16.8 | (1) | 2.47 | 0.50 | (6) | 0.38 | 0.23 |
| 29 | (D) | 12.0 | (b) | 12.0 | (1) | 2.17 | 0.50 | (6) | 0.34 | 0.23 |
| Comparative Example | | | | | | | | | | |
| 16 | (D) | 9.6 | (a) | 14.4 | (4) | 2.23 | — | — | — | — |
| 17 | (D) | 9.6 | (b) | 14.4 | (5) | 3.36 | — | (6) | 0.31 | — |
| 18 | (Q) | 9.6 | (h) | 14.4 | (7) | 3.3 | — | — | — | — |
| 19 | (Q) | 9.6 | (g) | 14.4 | (7) | 3.3 | — | — | — | — |
| 20 | (A) | 9.6 | (a) | 14.4 | (7) | 2.80 | 0.50 | (6) | 0.43 | 0.23 |
| 21 | (E) | 9.6 | (d) | 14.4 | (1) | 0.90 | 0.25 | (6) | 0.14 | 0.23 |
| 22 | (N) | 9.6 | (e) | 14.4 | (1) | 5.30 | 1.25 | (6) | 0.82 | 0.23 |
| 23 | (D) | 9.6 | (b) | 14.4 | (1) | 2.31 | 0.50 | (6) | 0.08 | 0.05 |
| 24 | (E) | 9.6 | (c) | 14.4 | (1) | 0.75 | 0.50 | (6) | 0.30 | 0.60 |

M = mol of an acid anhydride/mol of the total epoxy group in all the binders.
N = mol of a tertiary amine/mol of an acid anhydride.
(1) Methyltetrahydrophthalic anhydride.
(2) Methylhexahydrophthalic anhydride.
(3) Hexahydrophthalic anhydride.
(4) An aliphatic polyamine; a product of Asahi Denka Co., Ltd.; trade name, EH230; equivalent of active hydrogen = 88.
(5) A polythiol; a product of Yuka Shell Epoxy Co., Ltd.; trade name, QX-40; number of thiol group, 4; equivalent of SH, 133.
(6) Triethylenediamine.
(7) A polyisocyanate; trade name, Coronate L; a product of Nippon Polyurethane Co., Ltd.; an adduct of trimethylolpropane and TDI ($L_4$).

The magnetic coating material and the magnetic tape thus obtained were tested by the methods descriped in the following. Results are shown in Table 8.

1) Lacquer Pot Life Test

A binder, a crosslinking agent, and a catalyst in specified amounts were dissolved in tetrahydrofuran to form a 25% solution. The time to the formation of gel in this solution at a room temperature was measured. When the reactivity of the crosslinking is excessively high, the coating material loses the fluidity before it is applied to a substrate, and is not suitable for use.

2) Test of Stability of Dispersion

A magnetic coating material was applied to a polyester film immediately after it was prepared. The coating layer obtained after the crosslinking reaction was placed in touch with a VTR guide pin at 60° C. in an atmosphere of a relative humidity of 80%. The kinematic friction coefficient was measured while the tape was driven at a speed of 2000 mm/min with application of a load of 30 g. The result was classified into 3 classes in the order of a lower value to a higher value as following:

A (good running property): 0.3 or lower

B (fair running property): 0.3–0.4

C (poor running property): 0.4 or higher

4) Durability Test

A magnetic tape obtained after the crosslinking was placed in touch with a rotating drum having a polishing paper on the surface thereof at 40° C. in an atmosphere of a relative humidity of 80%, and a load of 100 g was applied. The drum was rotated at 150 rpm for 30 minutes, and degree of fouling formed by the magnetic coating material attached to the polishing paper was evaluated by visual observation. The result was classified into the following 3 classes: ○: no fouling; Δ: some fouling; x: significant fouling.

TABLE 8

| | lacquer pot life | stability of dispersion | running property | durability |
|---|---|---|---|---|
| Example 20 | more than 15 days | ○ | A | ○ |
| Example 21 | more than 15 days | ○ | A | ○ |
| Example 22 | more than 15 days | ○ | A | ○ |
| Example 23 | more than 15 days | ○ | A | ○ |
| Example 24 | more than 15 days | ○ | A | ○ |
| Example 25 | more than 15 days | ○ | A | ○ |
| Example 26 | more than 15 days | ○ | A | ○ |
| Example 27 | more than 15 days | ○ | A | ○ |
| Example 28 | more than 15 days | ○ | A | ○ |
| Example 29 | more than 15 days | ○ | A | ○ |
| Comparative Example 16 | 7 days | ○ | B | x |
| Comparative Example 17 | 2 hours | x | A | Δ |
| Comparative Example 18 | more than 15 days | ○ | B | Δ |
| Comparative Example 19 | more than 15 days | ○ | C | x |
| Comparative Example 20 | more than 15 days | ○ | C | Δ |
| Comparative Example 21 | more than 15 days | ○ | B | Δ |
| Comparative Example 22 | more than 15 days | ○ | A | Δ |
| Comparative Example 23 | more than 15 days | ○ | B | Δ |
| Comparative Example 24 | more than 15 days | ○ | A | Δ |

In all of Examples 20 to 29 in which the requirements of the present invention were satisfied, coating materials having a long lacquer pot life and stable dispersion were obtained, and magnetic recording media having the excellent running property and durability were prepared from the coating material.

In Comparative Example 16 in which an aliphatic polyamine was used as the crosslinking agent, the crosslinking was insufficient, and a magnetic tape inferior in the running property and the durability was obtained. In Comparative Example 17 in which a polythiol was used as the crosslinking agent, the magnetic coating material obtained had a very short lacquer pot life. In Comparative Examples 18 to 20 in which the polyurethane resin or the vinyl chloride polymer used as the binder did not satisfy the requirements of the present invention, magnetic tapes having unsatisfactory running property and durability were obtained. In Comparative Example 21 in which M was smaller than 0.3, and in Comparative Example 23 in which N was smaller than 0.10, the crosslinking was insufficient and the running property tended to be inferior. In Comparative Example 22 in which M was larger than 1.0, and in Comparative Example 24 in which N was larger than 0.28, the crosslinking of the coating layer was excessive, and the durability decreased.

What is claimed is:

1. A recording medium comprising a non-magnetic substrate and a magnetic layer thereover, which magnetic layer comprises magnetic powder dispersed therein, a crosslinked binder produced by crosslinking a binder composition which comprises (A) a polyurethane resin binder containing 2.2 to 7.0 terminal epoxy groups per molecule and (b) a sulfonic acid salt group, a carboxylic acid salt group, or a quaternary salt group in the molecule and having a number average molecular weight of 2,000 to 10,000, (B) a polymer selected from the group consisting of a vinyl chloride polymer having an average degree of polymerization of 100 to 500, a styrene polymer having a number average molecular weight of 5,000 to 50,000 and a (meth)acrylate polymer having a number average molecular weight of 5,000 to 50,000 as another binder, (C) an alicyclic acid anhydride in such an amount that the ratio by mol of the alicyclic anhydride to the total epoxy group is from 0.30 to 1.0, as a crosslinking agent, and (E) a tertiary amine in such an amount that the ratio by mol of the tertiary amine to the alicyclic acid anhydride is from 0.10 to 0.28, as a catalyst; and at least one of the binders is crosslinked between the epoxy groups therein by a reaction which includes components (C) and (E) as reactants.

2. A recording medium according to claim 1, wherein the polyurethane resin contains 2.3 to 5.0 terminal epoxy groups in one molecule in average.

3. A recording medium according to claim 1, wherein the polyurethane resin has a number-average molecular weight of 2,500 to 8,000.

4. A recording medium according to claim 1, wherein the vinyl chloride polymer has an average degree of polymerization of 100 to 200.

5. A recording medium comprising a non-magnetic substrate and a magnetic layer thereover, which magnetic layer comprises magnetic powder dispersed therein, a crosslinked binder produced by crosslinking a binder composition which comprises (A) a polyurethane resin binder containing 2.2 to 7.0 terminal epoxy groups per molecule and (b) a sulfonic acid salt group, a carboxylic acid salt group, or a quaternary salt group in the molecule and having a number average molecular weight of 2,000 to 10,000, wherein the amount of the sulfonic acid salt group is from 0.1 to 5.0% by weight as $SO^-_3$, and the amount of the carboxylic acid salt group is from 0.05 to 3.0% by weight as COO— and the amount of the quaternary ammonium salt group is from 0.02 to 1.0% by weight as $N^+$, (B) a polymer selected from the group consisting of a vinyl chloride polymer having an average degree of polymerization of 100 to 500, a styrene polymer having a number average molecular weight of 5,000 to 50,000 and a (meth)acrylate polymer having a number average molecular weight of 5,000 to 50,000, as another binder, (C) an alicyclic acid anhydride in such an amount that the ratio by mol of the alicyclic anhydride to the total epoxy group is from 0.30 to 1.0, as a crosslinking agent, and (E) a tertiary amine in such an amount that the ratio by mol of the tertiary amine to the alicyclic acid anhydride is from 0.10 to 0.28, as a catalyst; and at least one of the binders is crosslinked between the epoxy groups therein by a reaction which includes components (C) and (E) as reactants.

6. A recording medium according to claim 5, wherein the polyurethane resin contains 2.3 to 5.0 terminal epoxy groups in one molecule in average.

7. A recording medium according to claim 5, wherein the polyurethane resin has a number-average molecular weight of 2,500 to 8,000.

8. A recording medium according to claim 5, wherein the vinyl chloride polymer has an average degree of polymerization of 100 to 200.

9. A recording medium according to claim 5, wherein the vinyl chloride polymer, the styrene polymer, or the (meth- )acrylate polymer of the (B) component of the binder from which the crosslinked binder is produced additionally contains at least one of anionic hydrophilic groups which are selected from the group consisting of carboxyl group, acids containing sulfur or phosphorus, and salts of acids containing sulfur or phosphorus, and cationic hydrophilic groups which are selected from the group consisting of $-N^+R^1R^2R^3X^-$ and $-N^+R^1R^2 \cdot HX^1$, wherein R, $R^2$, and $R^3$ each represent an alkyl group, an alkenyl group, or an alkoxy group, and X and $X^1$ each represent a halogen, a residue group of an inorganic acid selected from sulfuric acid, phosphoric acid, and nitric acid, or a residue group of an organic acid selected from carboxylic acids, hydrogensulfuric acid esters, and hydrogenphosphoric acid esters.

10. A recording medium according to claim 9, wherein the polyurethane resin contains 2.3 to 5.0 terminal epoxy groups in one molecule in average.

11. A recording medium according to claim 9, wherein the polyurethane resin has a number-average molecular weight of 2,500 to 8,000.

12. A recording medium according to claim 9, wherein the vinyl chloride polymer has an average degree of polymerization of 100 to 200.

* * * * *